United States Patent
Choi et al.

(10) Patent No.: US 12,154,337 B2
(45) Date of Patent: Nov. 26, 2024

(54) ELECTRONIC DEVICE FOR RECOGNIZING OBJECT AND OPERATING METHOD THEREOF

(71) Applicant: SAMSUNG ELECTRONICS CO., LTD., Suwon-si (KR)

(72) Inventors: Hyunsoo Choi, Suwon-si (KR); Sungjin Kim, Suwon-si (KR); Inhak Na, Suwon-si (KR); Myungjin Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 672 days.

(21) Appl. No.: 17/328,626

(22) Filed: May 24, 2021

(65) Prior Publication Data

US 2022/0004805 A1 Jan. 6, 2022

(30) Foreign Application Priority Data

Jul. 3, 2020 (KR) .......................... 10-2020-0082302

(51) Int. Cl.
G06V 20/50 (2022.01)
G06F 18/20 (2023.01)
(Continued)

(52) U.S. Cl.
CPC .......... *G06V 20/50* (2022.01); *G06F 18/2431* (2023.01); *G06F 18/285* (2023.01);
(Continued)

(58) Field of Classification Search
CPC ........ G06V 20/50; G06V 20/60; G06V 20/64; G06V 20/68; G06V 20/66; G06V 20/647;
(Continued)

(56) References Cited

U.S. PATENT DOCUMENTS 9,607,355 B2 3/2017 Zou et al.
2007/0115373 A1 5/2007 Gallagher et al.
(Continued)

FOREIGN PATENT DOCUMENTS

KR 10-2019-0094318 A 8/2019
KR 10-2020-0055239 A 5/2020
WO 2019/164484 A1 8/2019

OTHER PUBLICATIONS

International Search Report (PCT/ISA/210) and Written Opinion (PCT/ISA/237) issued Jul. 9, 2021 by the International Searching Authority in International Patent Application No. PCT/KR2021/005227.
Communication issued on Aug. 1, 2023 by the European Patent Office in European Patent Application No. 21831598.4.

*Primary Examiner* — Margaret G Mastrodonato
(74) *Attorney, Agent, or Firm* — Sughrue Mion, PLLC

(57) ABSTRACT

A method of performing object recognition is performed by an electronic device and includes obtaining a spatial map of a space, using a first recognition model, recognizing one or more objects in the space, to obtain first object information of the objects, and dividing the space into a plurality of subset spaces, based on the obtained spatial map and the obtained first object information. The method further includes determining at least one second recognition model to be allocated to each of the plurality of subset spaces into which the space is divided, based on characteristic information of each of the plurality of subset spaces, and using the determined at least one second recognition model allocated to each of the plurality of subset spaces, performing object recognition on each of the plurality of subset spaces, to obtain second object information.

19 Claims, 18 Drawing Sheets

(51) Int. Cl.
  *G06F 18/2431* (2023.01)
  *G06V 10/70* (2022.01)
  *G06V 10/764* (2022.01)
  *G06V 10/94* (2022.01)
  *G06V 20/64* (2022.01)

(52) U.S. Cl.
  CPC ............ *G06V 10/764* (2022.01); *G06V 10/87* (2022.01); *G06V 10/95* (2022.01); *G06V 20/64* (2022.01); *G06V 20/647* (2022.01)

(58) Field of Classification Search
  CPC .... G06V 10/87; G06V 10/765; G06V 10/764; G06V 10/82
  See application file for complete search history.

(56) References Cited

U.S. PATENT DOCUMENTS

| | | |
|---|---|---|
| 2008/0183383 A1 | 7/2008 | Asai et al. |
| 2014/0193074 A1* | 7/2014 | Huang .................. G06V 10/50 382/180 |
| 2015/0347872 A1 | 12/2015 | Taylor et al. |
| 2016/0210525 A1* | 7/2016 | Yang .................. G06V 40/103 |
| 2018/0039835 A1* | 2/2018 | Rajkumar ............ G06V 10/764 |
| 2018/0158210 A1 | 6/2018 | Estrada et al. |
| 2021/0174151 A1* | 6/2021 | Paula .................. H04W 12/122 |

\* cited by examiner

FIG. 4

| FIRST OBJECT INFORMATION ||||
|---|---|---|---|
| OBJECT NUMBER | OBJECT | LARGE CATEGORY | PRODUCT LOCATION |
| 1 | TV | ELECTRONIC PRODUCTS | (x1, y1) |
| 2 | WASHER | ELECTRONIC PRODUCTS | (x2, y2) |
| 3 | REFRIGERATOR | ELECTRONIC PRODUCTS | (x3, y3) |
| 4 | DRYER | ELECTRONIC PRODUCTS | (x4, y4) |
| 5 | MONITOR | ELECTRONIC PRODUCTS | (x5, y5) |
| 6 | COMPUTER | ELECTRONIC PRODUCTS | (x6, y6) |
| 7 | CELLULAR PHONE | ELECTRONIC PRODUCTS | (x7, y7) |
| 8 | APPLE | GROCERIES | (x8, y8) |
| 9 | BANANA | GROCERIES | (x9, y9) |
| 10 | MILK | GROCERIES | (x10, y10) |
| ... | ... | ... | ... |

FIG. 10D

| MODEL NUMBER | SECOND RECOGNITION MODEL | |
|---|---|---|
| | RECOGNITION TARGET | CLASS PROPORTION |
| SECOND RECOGNITION MODEL A | ELECTRONIC PRODUCTS, GROCERIES | ELECTRONIC PRODUCTS: 70%, GROCERIES: 30% |
| SECOND RECOGNITION MODEL B | ELECTRONIC PRODUCTS, GROCERIES | ELECTRONIC PRODUCTS: 60%, GROCERIES: 40% |
| SECOND RECOGNITION MODEL C | ELECTRONIC PRODUCTS, GROCERIES | ELECTRONIC PRODUCTS: 30%, GROCERIES: 70% |
| SECOND RECOGNITION MODEL D | ELECTRONIC PRODUCTS, GROCERIES | ELECTRONIC PRODUCTS: 40%, GROCERIES: 60% |
| SECOND RECOGNITION MODEL E | ELECTRONIC PRODUCTS | ELECTRONIC PRODUCTS: 100% |
| SECOND RECOGNITION MODEL F | GROCERIES | GROCERIES: 100% |
| ... | ... | ... |
| SECOND RECOGNITION MODEL K | A, B | A: 50%, B: 50% |

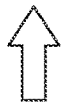

| SECOND RECOGNITION MODEL DETERMINED FOR EACH SUBSET SPACE | |
|---|---|
| SUBSET SPACE NUMBER | MODEL NUMBER |
| FIRST SUBSET SPACE | SECOND RECOGNITION MODEL E |
| SECOND SUBSET SPACE | SECOND RECOGNITION MODELS E AND F |
| THIRD SUBSET SPACE | SECOND RECOGNITION MODEL B |
| FOURTH SUBSET SPACE | SECOND RECOGNITION MODEL A OR B |
| FIFTH SUBSET SPACE | SECOND RECOGNITION MODEL C |
| SIXTH SUBSET SPACE | SECOND RECOGNITION MODEL G, H |
| SEVENTH SUBSET SPACE | SECOND RECOGNITION MODEL A |
| ... | ... |
| N-th SUBSET SPACE | SECOND RECOGNITION MODEL K |

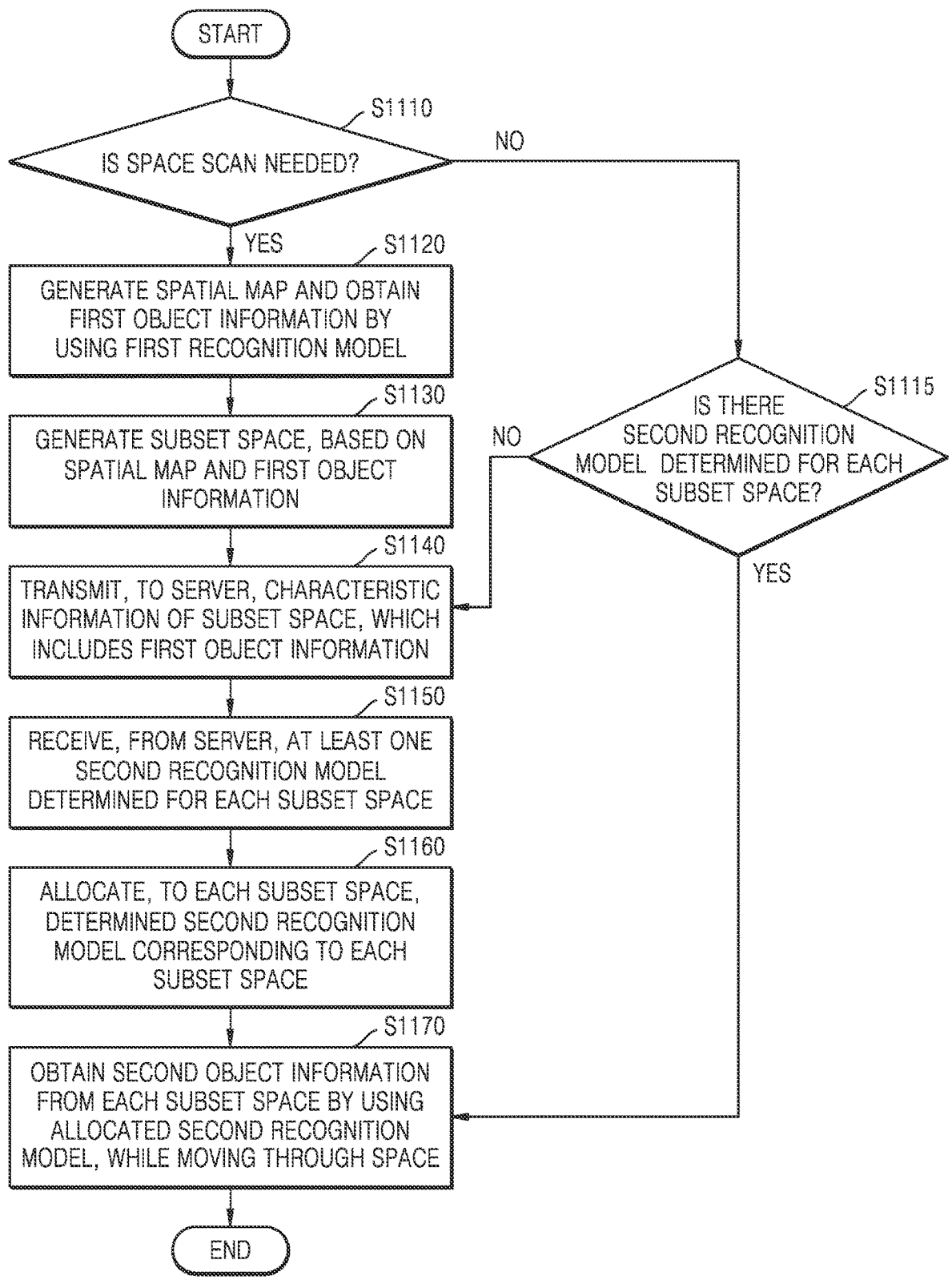

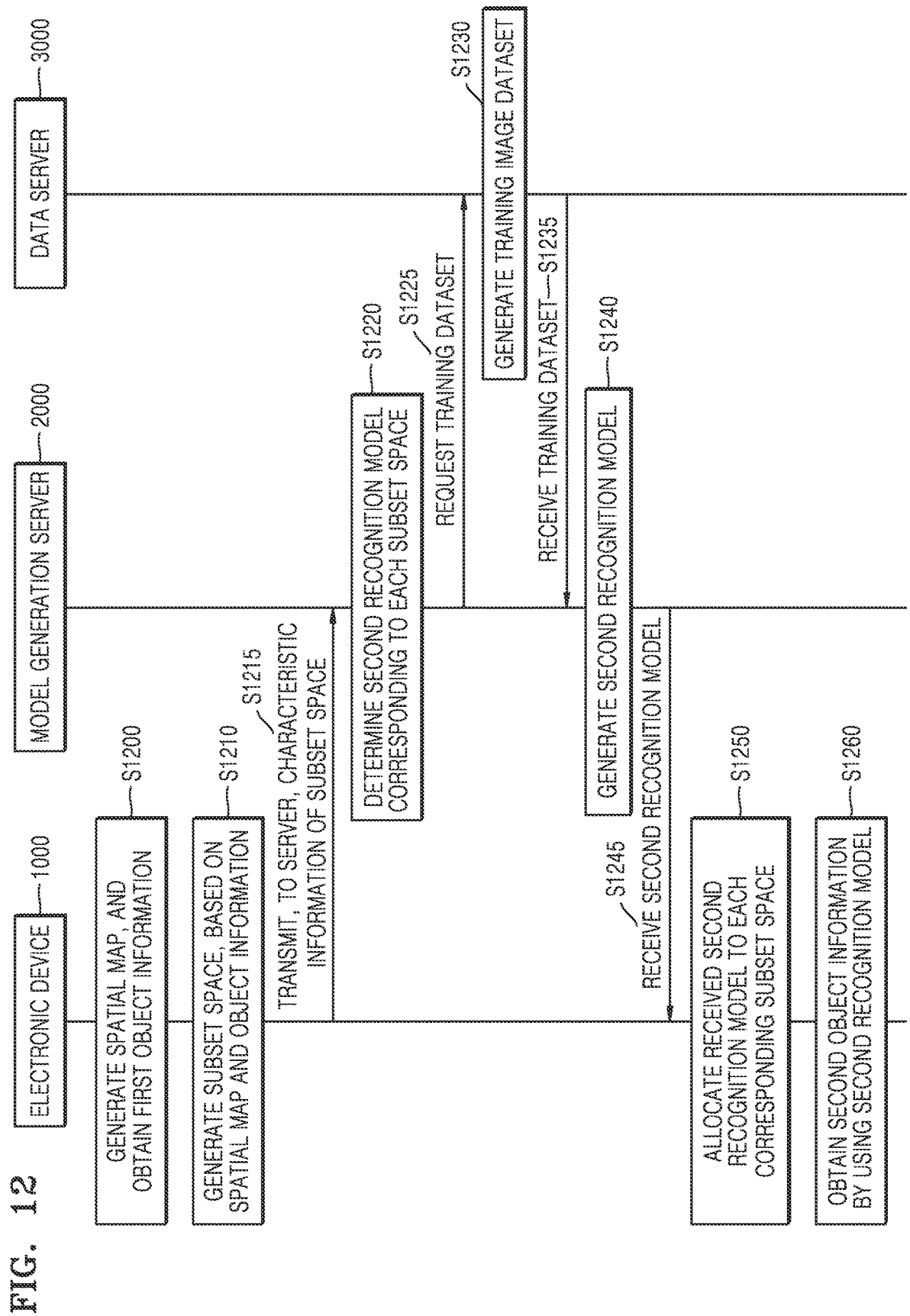

ELECTRONIC DEVICE FOR RECOGNIZING OBJECT AND OPERATING METHOD THEREOF

CROSS-REFERENCE TO RELATED APPLICATION

This application is based on and claims priority under 35 U.S.C. § 119 to Korean Patent Application No. 10-2020-0082302, filed on Jul. 3, 2020, in the Korean Intellectual Property Office, the disclosure of which is incorporated by reference herein in its entirety.

BACKGROUND

1. Field

The disclosure relates to an electronic device for recognizing an object and to an operating method of the electronic device, and more particularly, to an electronic device for logically dividing a physical space and performing object recognition using a plurality of recognition models and to an operating method of the electronic device.

2. Description of Related Art

Artificial Intelligence (AI) systems refer to computer systems in which machines, by themselves, derive intended results or perform intended operations by performing self-training and making determinations, unlike existing rule-based smart systems. Along with an increasing number of times AI systems are used, the AI systems exhibit improved recognition rates and more accurately understand user's preferences, and thus, the existing rule-based smart systems are gradually substituted with deep learning-based AI systems.

AI technology includes machine learning (deep learning) and element technologies that use machine learning. Machine learning refers to an algorithm technology for self-classifying/learning features of a plurality of pieces of input data, and element technologies include technical fields such as linguistic understanding, visual understanding, inference/prediction, knowledge representation, and motion control, which use machine learning algorithms such as deep learning.

Element technologies for implementing AI technology may include any one or any combination of a linguistic understanding technology for recognizing languages/letters of humans, a visual understanding technology for recognizing things as human eyes do, an inference/prediction technology for identifying information and making logical inferences and predictions, a knowledge representation technology for processing experience information of humans into knowledge data, and a motion control technology for controlling movements of robots.

SUMMARY

Provided is an electronic device, which includes a plurality of recognition models, and which is capable of recognizing an object with high accuracy by using computing resources of the electronic device and through object recognition that is performed by logically dividing a physical space and allocating a recognition model corresponding to spatial characteristics to each space. Also provided is a method of operating the electronic device.

Additional aspects will be set forth in part in the description that follows and, in part, will be apparent from the description, or may be learned by practice of presented embodiments.

According to an embodiment of the disclosure, there is provided a method, performed by an electronic device, of performing object recognition, the method including obtaining a spatial map of a space, using a first recognition model, recognizing one or more objects in the space, to obtain first object information of the objects, and dividing the space into a plurality of subset spaces, based on the obtained spatial map and the obtained first object information. The method further includes determining at least one second recognition model to be allocated to each of the plurality of subset spaces into which the space is divided, based on characteristic information of each of the plurality of subset spaces, and using the determined at least one second recognition model allocated to each of the plurality of subset spaces, performing object recognition on each of the plurality of subset spaces, to obtain second object information.

The obtaining of the spatial map may include obtaining spatial structure information of the space by scanning the space, and generating the spatial map, based on the obtained spatial structure information.

The determining of the at least one second recognition model may include requesting, from a server, the at least one second recognition model, and receiving, from the server, the requested at least one second recognition model.

The determining of the at least one second recognition model may further include transmitting, to the server, the characteristic information of each of the plurality of subset spaces. The at least one second recognition model received from the server may be determined by the server, based on the transmitted characteristic information of each of the plurality of subset spaces.

The dividing of the space into the plurality of subset spaces may include determining a number of the plurality of subset spaces, based on a number of classes into which the one or more objects recognized in the space are classified.

The dividing of the space into the plurality of subset spaces may include dividing the space into a plurality of unit spaces with a same shape and a same area, based on the obtained spatial map, grouping, into a plurality of groups, the plurality of unit spaces into which the space is divided, based on the obtained first object information, and setting the plurality of subset spaces so that each of the plurality of subset spaces includes one or more of the plurality of unit spaces that are grouped into a same group among the plurality of groups.

The grouping of the plurality of unit spaces may include grouping, into the plurality of groups, the plurality of unit spaces, based on any one or any combination of a number of at least one of the one or more objects for each of classes and priority information between the classes, the at least one of the one or more objects being included in each of the plurality of unit spaces.

The grouping of the plurality of unit spaces may further include determining a class that is present in a largest number of the at least one of the one or more objects included in each of the plurality of unit spaces, among the classes, to be characteristic information of each of the plurality of unit spaces, and grouping together one or more among the plurality of unit spaces having a same characteristic information among the characteristic information of each of the plurality of unit spaces.

The characteristic information of each of the plurality of subset spaces may include information of a number of at least one of the one or more objects for each class, the at least one of the one or more objects being included in each of the plurality of subset spaces, and the determining of the at least one second recognition model may include determining the at least one second recognition model to be allocated to each of the plurality of subset spaces into which the space is divided, based on the information of the number of the at least one of the one or more objects for each class.

According to an embodiment of the disclosure, there is provided an electronic device for recognizing an object, the electronic device including a memory storing one or more instructions and a plurality of recognition models, and a processor configured to execute the one or more instructions stored in the memory to obtain a spatial map of a space, using a first recognition model among the plurality of recognition models stored in the memory, recognize one or more objects in the space, to obtain first object information of the objects, and divide the space into a plurality of subset spaces, based on the obtained spatial map and the obtained first object information. The processor is further configured to execute the one or more instructions stored in the memory to determine at least one second recognition model to be allocated to each of the plurality of subset spaces into which the space is divided, among the plurality of recognition models stored in the memory, based on characteristic information of each of the plurality of subset spaces, and using the determined at least one second recognition model allocated to each of the plurality of subset spaces, perform object recognition on each of the plurality of subset spaces, to obtain second object information.

The electronic device may further include one or more sensors configured to obtain spatial structure information about the space by scanning the space. The processor may be further configured to execute the one or more instructions stored in the memory to generate the spatial map, based on the obtained spatial structure information.

The electronic device may further include a communication interface. The processor may be further configured to execute the one or more instructions stored in the memory to control the communication interface to transmit, to a server, a request for the at least one second recognition model, and receive, from the server, the requested at least one second recognition model.

The processor may be further configured to execute the one or more instructions stored in the memory to control the communication interface to transmit, to the server, the characteristic information of each of the plurality of subset spaces. The at least one second recognition model received from the server may be determined by the server, based on the transmitted characteristic information of each of the plurality of subset spaces.

The processor may be further configured to execute the one or more instructions stored in the memory to determine a number of the plurality of subset spaces, based on a number of classes into which the one or more objects recognized in the space are classified.

The processor may be further configured to execute the one or more instructions stored in the memory to divide the space into a plurality of unit spaces with a same shape and a same area, based on the obtained spatial map, group, into a plurality of groups, the plurality of unit spaces into which the space is divided, based on the obtained first object information, and set the plurality of subset spaces so that each of the plurality of subset spaces includes one or more of the plurality of unit spaces that are grouped into a same group among the plurality of groups.

The processor may be further configured to execute the one or more instructions stored in the memory to group, into the plurality of groups, the plurality of unit spaces, based on any one or any combination of a number of at least one of the one or more objects for each of classes and priority information between the classes, the at least one of the one or more objects being included in each of the plurality of unit spaces.

The processor may be further configured to execute the one or more instructions stored in the memory to determine a class that is present in a largest number of the at least one of the one or more objects included in each of the plurality of unit spaces, among the classes, to be characteristic information of each of the plurality of unit spaces, and group together one or more among the plurality of unit spaces having a same characteristic information among the characteristic information of each of the plurality of unit spaces.

The characteristic information of each of the plurality of subset spaces may include information of a number of at least one of the one or more objects for each class, the at least one of the one or more objects being included in each of the plurality of subset spaces, and the processor may be further configured to execute the one or more instructions stored in the memory to determine the at least one second recognition model to be allocated to each of the plurality of subset spaces into which the space is divided, based on the information of the number of the at least one of the one or more objects for each class.

A computer-readable recording medium having recorded thereon a program for executing the method on a computer.

According to an embodiment of the disclosure, there is provided a method of performing object recognition, the method being performed by an electronic device, and the method including obtaining a spatial map of a space; using a first recognition model, recognizing one or more objects in the space, to obtain first object information of the objects; dividing the space into a plurality of subset spaces, based on the obtained spatial map and the obtained first object information; determining a class that is present in a largest number of at least one of the one or more objects included in each of the plurality of subset spaces into which the space is divided, among classes, to obtain characteristic information of each of the plurality of subset spaces; determining at least one second recognition model for each of the plurality of subset spaces, based on the obtained characteristic information of each of the plurality of subset spaces; and using the determined at least one second recognition model for each of the plurality of subset spaces, recognizing at least one object in each of the plurality of subset spaces, to obtain second object information of the at least one object.

BRIEF DESCRIPTION OF THE DRAWINGS

The above and other aspects, features, and advantages of embodiments of the disclosure will be more apparent from the following description taken in conjunction with the accompanying drawings, in which:

FIG. 4 is a diagram illustrating first object information obtained by an electronic device by using a first recognition model, according to an embodiment of the disclosure;

FIG. 11 is a flowchart illustrating operations of an electronic device for operating recognition models, according to an embodiment of the disclosure;

FIG. 12 is a swim lane diagram illustrating operations of an overall system of an electronic device, a model generation server, and a data server, according to an embodiment of the disclosure.

DETAILED DESCRIPTION

Figure 1A:
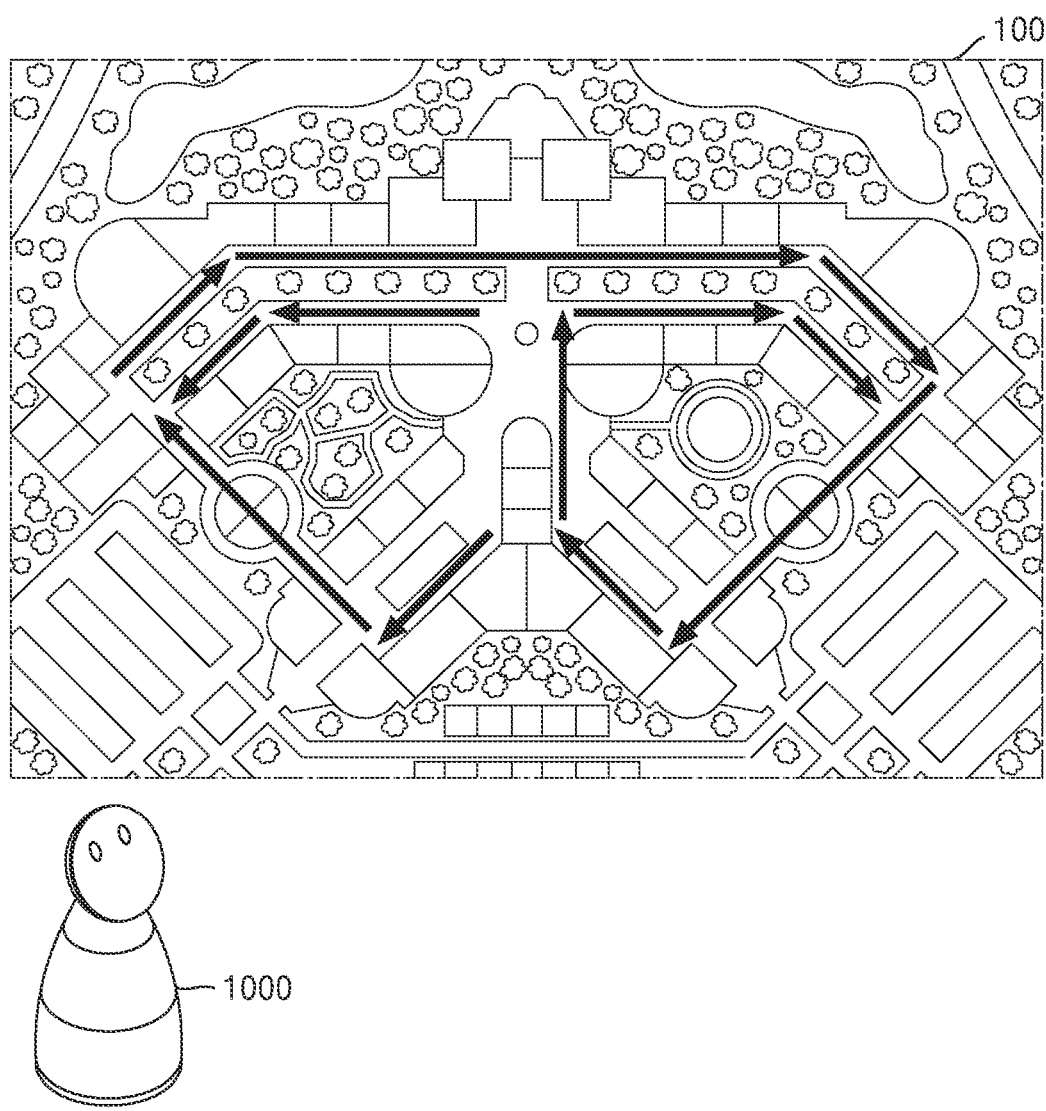
FIG. 1A is a diagram illustrating a method, performed by an electronic device, of scanning a space while the electronic device explores the space to generate a spatial map for the space, according to an embodiment of the disclosure.

Terms used herein will be briefly described first, and the disclosure will be described in detail.

Although terms used herein are of among general terms which are currently and broadly used by considering functions in the disclosure, these terms may vary according to intentions of those of ordinary skill in the art, precedents, the emergence of new technologies, or the like. In addition, there may be terms selected arbitrarily by the applicants in particular cases, and in these cases, the meaning of those terms will be described in detail in the corresponding portions of the detailed description. Therefore, the terms used herein may be defined based on the meaning thereof and descriptions made throughout the specification, rather than based on names simply called.

It will be understood that, throughout the specification, when a region such as an element, a component, a layer, or the like is referred to as "comprising" or "including" a component such as an element, a region, a layer, or the like, the region may further include another component in addition to the component rather than excludes the other component, unless otherwise stated. In addition, the term such as " . . . unit," " . . . portion," " . . . module," or the like used herein refers to a unit for processing at least one function or operation, and this may be implemented by hardware, software, or a combination of hardware and software.

Throughout the disclosure, the expressions "at least one of a, b or c" and "any one or any combination of a, b or c" indicate only a, only b, only c, both a and b, both a and c, both b and c, all of a, b, and c, or variations thereof.

Hereinafter, embodiments of the disclosure will be described in detail with reference to the accompanying drawings to allow one of ordinary skill in the art to readily make implementations thereof. However, it may be understood that the disclosure may be embodied in different ways and is not limited to embodiments described herein. In addition, portions irrelevant to the description may be omitted from the drawings for clarity, and like components will be denoted by like reference numerals throughout the specification.

Figure 1B:
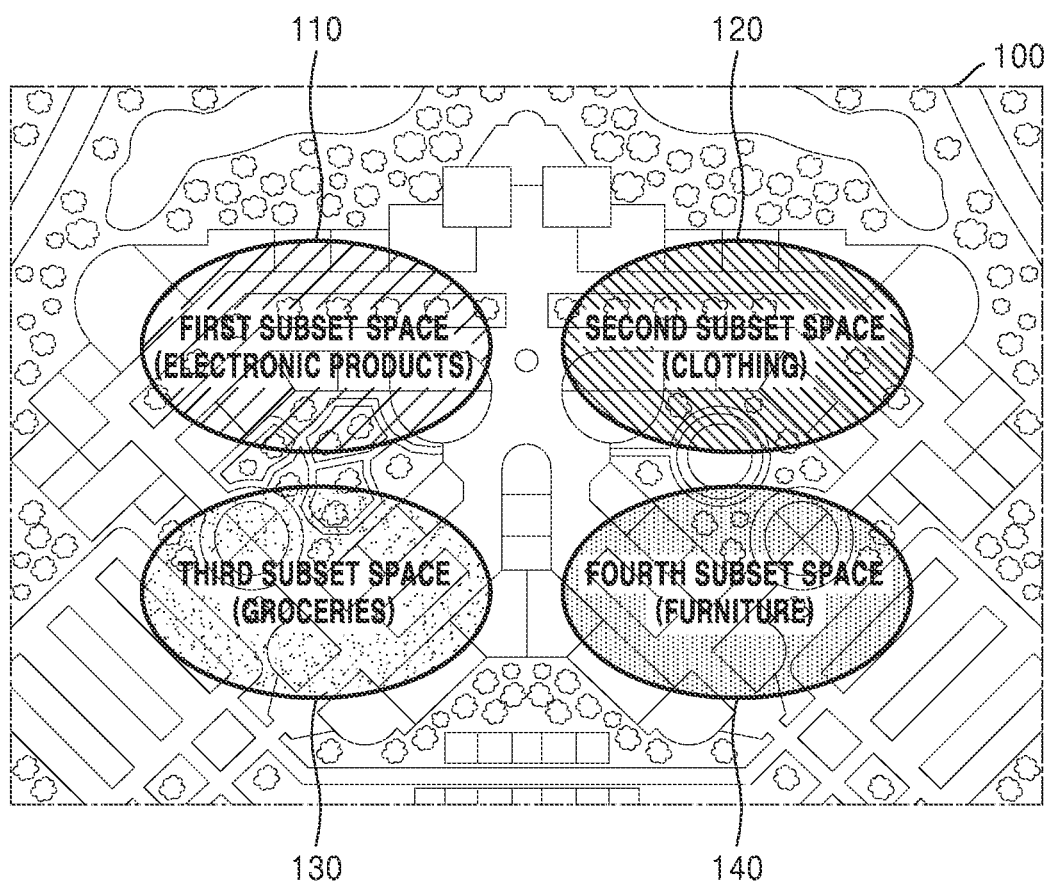
FIG. 1B is a diagram illustrating a method, performed by an electronic device, of dividing a space into a plurality of subset spaces, according to an embodiment of the disclosure.

FIG. 1A is a diagram illustrating a method of an electronic device scanning a space while the electronic device explores the space to generate a spatial map for the space, according to an embodiment of the disclosure. FIG. 1B is a diagram illustrating a method of the electronic device dividing a space into a plurality of subset spaces, according to an embodiment of the disclosure. FIG. 10 is a diagram illustrating a method of the electronic device recognizing an object by using recognition models in a plurality of subset spaces, according to an embodiment of the disclosure.

An electronic device 1000 according to an embodiment of the disclosure may include a robotic device capable of performing various functions while moving through a space. For example, the electronic device 1000 may include, but is not limited to, a robotic vacuum cleaner capable of performing a cleaning function, a retail-bot capable of performing a shopping or serving function, a guide-bot capable of performing a guidance function, a porter-bot capable of carrying luggage, or the like. In addition, the electronic device 1000 according to an embodiment of the disclosure may include a device capable of moving by itself by using a wheel or the like, and the electronic device 1000 may explore a space and generate a spatial map, by using at least one sensor. Here, the space may refer to a space through which the electronic device 1000 may substantially move. Hereinafter, for convenience of description, descriptions will be made by taking a "shopping mall" as an example.

Figure 1C:
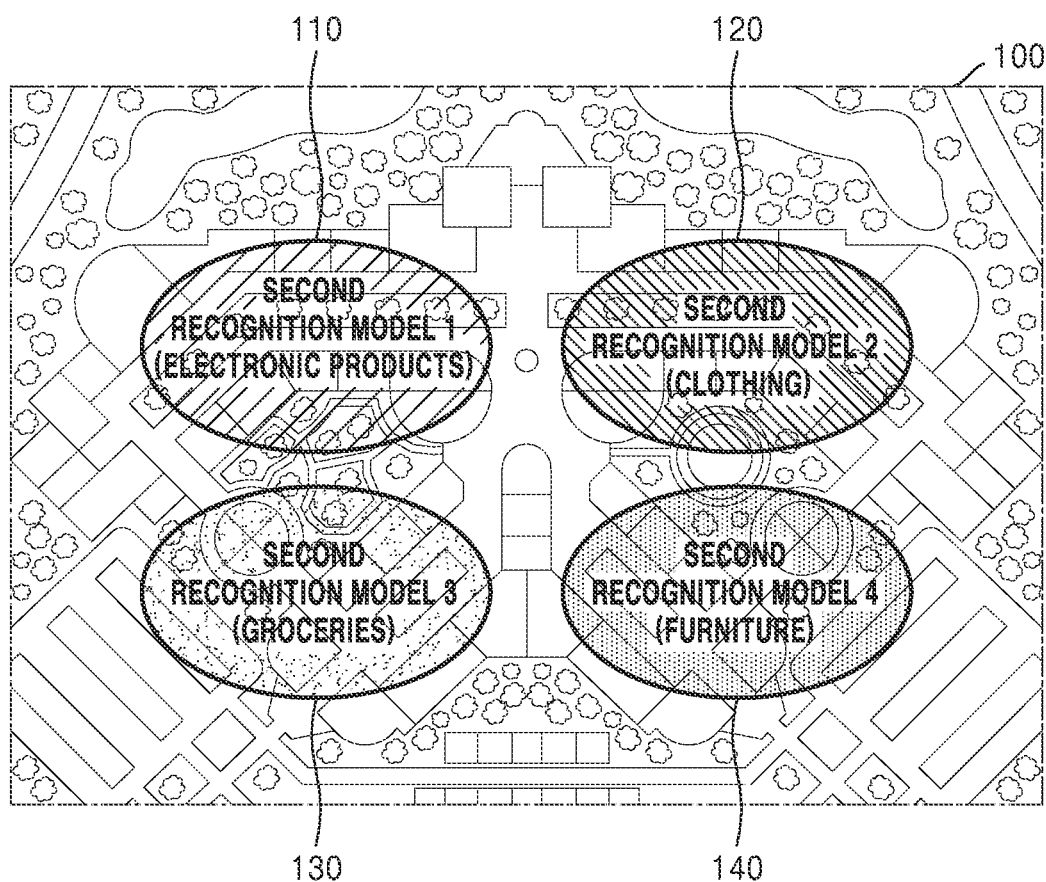
FIG. 1C is a diagram illustrating a method, performed by an electronic device, of recognizing an object by using recognition models in a plurality of subset spaces, according to an embodiment of the disclosure.

Referring to FIG. 1A, the electronic device 1000 may explore a spatial structure of the shopping mall by using at least one sensor, while moving through the shopping mall. For example, as shown in FIG. 1A, while moving through the shopping mall along a path indicated by arrows, the electronic device 1000 may scan the space and obtain spatial structure information about the shopping mall, by using a camera, a ultrasonic sensor, a Lidar sensor, an obstacle sensor, or the like. However, the path shown in FIG. 1 is one embodiment, and the spatial structure information of the shopping mall may be obtained via various paths. The electronic device 1000 may generate a spatial map 100 for the shopping mall, based on the obtained spatial structure information.

In addition, the electronic device 1000 may also obtain the spatial map 100 for the shopping mall from an external device connected to the electronic device 1000. For example, although the electronic device 1000 may obtain the spatial map from a server connected to the electronic device 1000 or from another robotic device around the electronic device 1000, the disclosure is not limited thereto.

In addition, the electronic device 1000 may store a plurality of recognition models. The electronic device 1000 may receive the plurality of recognition models from an external device (for example, a server) and store the plurality of recognition models in a memory, and the plurality of recognition models stored in the memory may be updated. The plurality of recognition models may refer to models for performing object recognition on one or more objects and may include a first recognition model and a plurality of second recognition models.

As used herein, the term "object recognition" may refer to obtaining information about an object (that is, object information) from an image of the object. The "object information" may include location information of the object, which indicates where the object in the image is, and classification information of the object.

As used herein, the term "recognition model" may refer to, but is not limited to, an artificial intelligence model including one or more neural networks, which are trained to receive an image of an object as input data and obtain object information by performing object recognition on one or more objects in the image.

While moving through a whole space (for example, the whole shopping mall), the electronic device 1000 according to an embodiment of the disclosure may detect objects in the whole space and obtain first object information about the detected objects (location information and classification information of the objects), by using the first recognition model from among the plurality of recognition models.

In addition, the electronic device 1000 according to an embodiment of the disclosure may divide the space into a plurality of subset spaces, based on the first object information. For example, the electronic device 1000 may logically divide the space, based on location information and classification information (first object information) of an object recognized in the whole space.

For example, as shown in the spatial map 100 of FIG. 1B, a space in which objects recognized as "electronic products" are present in a proportion or more may be classified as a first subset space 110, a space in which objects recognized as "clothing" are present in a proportion or more may be classified as a second subset space 120, a space in which objects recognized as "groceries" are present in a proportion or more may be classified as a third subset space 130, and a space in which objects recognized as "furniture" are present in a proportion or more may be classified as a fourth subset space 140. However, for convenience of description, although FIG. 1B illustrates that the whole space is divided into four subset spaces, the disclosure is not limited thereto, and the whole space may be divided into various numbers of subset spaces. A method, performed by the electronic device 1000, of logically dividing a space will be described in detail with reference to FIGS. 5 to 7.

The electronic device 1000 according to an embodiment of the disclosure may determine and allocate a second recognition model, which is a recognition model to be used in each of the plurality of subset spaces. A method, performed by the electronic device 1000, of determining and allocating the second recognition model to be used in each of the plurality of subset spaces will be described in detail with reference to FIG. 9. The second recognition model, which is described below and is to be used in each of the plurality of subset spaces, may be the same or different for each subset space.

As shown in FIG. 10, in the case of the first subset space 110 classified as an "electronic product" group, the electronic device 1000 may perform object recognition by using the second recognition model, which is capable of performing classification into subclasses of electronic products, from among the plurality of second recognition models. In this case, for example, the second recognition model may include, but is not limited to, a model capable of classifying objects into televisions (TVs), refrigerators, gas stoves, ovens, washers, dryers, vacuum cleaners, computers, and the like, which are subclasses of electronic products.

In addition, in the case of the second subset space 120 classified as a "clothing" group, the electronic device 1000 may perform object recognition by using the second recognition model, which is capable of performing classification into subclasses of clothing, from among the plurality of second recognition models. In this case, for example, the second recognition model may include, but is not limited to, a model capable of classifying objects into suits, casual wear, sportswear, hiking wear, swimwear, children's wear, shoes, hats, glasses, and the like, which are subclasses of clothing.

Further, in the case of the third subset space 130 classified as a "grocery" group, the electronic device 1000 may perform object recognition by using the second recognition model, which is capable of performing classification into subclasses of groceries, from among the plurality of second recognition models. In this case, for example, the second recognition model may include, but is not limited to, a model capable of classifying objects into meat, fish and shellfish, vegetables, fruits, processed food, and the like, which are subclasses of groceries.

Furthermore, in the case of the fourth subset space 140 classified as a "furniture" group, the electronic device 1000 may perform object recognition by using the second recognition model, which is capable of performing classification into subclasses of furniture, from among the plurality of second recognition models. In this case, for example, the second recognition model may include, but is not limited to, a model capable of classifying objects into beds, dining tables, sofas, desks, chairs, shelves, closets, and the like, which are subclasses of furniture.

The electronic device 1000 according to an embodiment of the disclosure may logically divide a space based on object information about objects in the space, instead of physically dividing the space based on structure information thereof. In addition, the electronic device 1000 according to an embodiment of the disclosure may object recognition on the subset spaces, which are divided spaces, in more detail according to characteristics of the divided spaces by using the second recognition model for recognizing objects in the subset spaces, thereby efficiently performing the object recognition. The second recognition models respectively used in the plurality of subset spaces may be models exhibiting higher accuracy than the first recognition model, which is used in the whole space to obtain the object information, although having a smaller number of recognizable objects (a smaller number of classes for recognizing and classifying objects) than the first recognition model.

Figure 2:
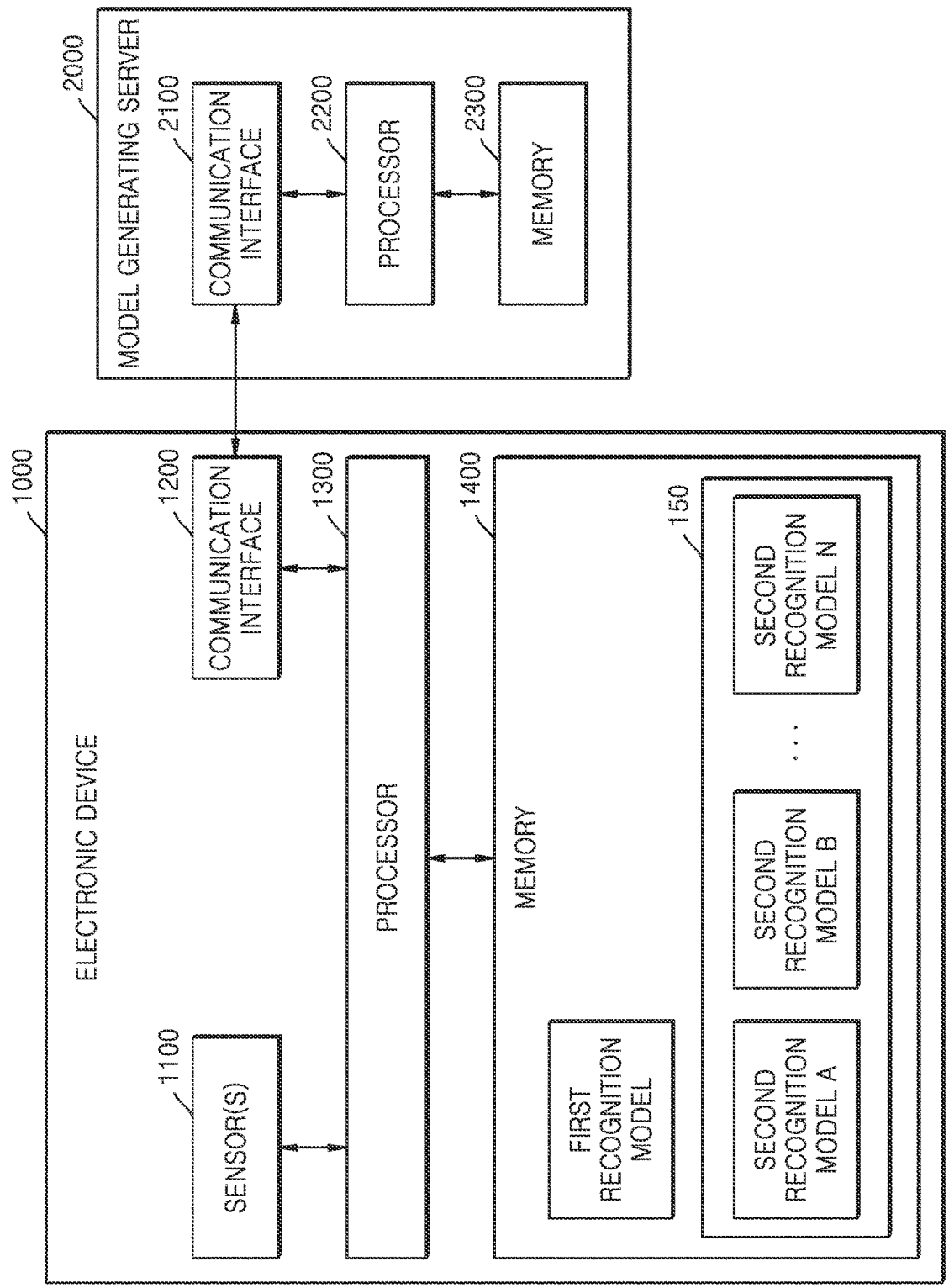
FIG. 2 is a block diagram illustrating configurations of an electronic device that performs object recognition and a server, according to an embodiment of the disclosure.

FIG. 2 is a block diagram illustrating configurations of an electronic device that performs object recognition and a server, according to an embodiment of the disclosure.

Referring to FIG. 2, the electronic device 1000 may be connected to a model generation server 2000 in a wired or wireless manner and may perform data communication with the model generation server 2000.

The electronic device 1000 according to an embodiment of the disclosure may include, at least, sensor(s) 1100, a communication interface 1200, a processor 1300, and a memory 1400.

The sensor(s) 1100 may include various sensors configured to sense information about a surrounding environment of the electronic device 1000. For example, the sensor(s) 1100 may include, but is not limited to, an image sensor (camera), an infrared sensor, an ultrasonic sensor, a Lidar sensor, an obstacle sensor, or the like. For example, the sensor(s) 1100 may obtain spatial structure information of a space by using any one or any combination of a camera, an ultrasonic sensor, or a Lidar sensor. In another example, the sensor(s) 1100 may obtain, by using a camera, object image data for performing object recognition.

The communication interface 1200 may transmit data or signals to and receive data or signals from an external device (for example, the model generation server 2000) by control by the processor 1300.

The communication interface 1200 according to an embodiment of the disclosure may include, but is not limited to, a short-range wireless communication unit, a mobile communication unit, or the like, in correspondence with the capability and structure of the electronic device 1000.

The short-range wireless communication unit may include, but is not limited to, a Bluetooth communication unit, a Bluetooth Low Energy (BLE) communication unit, a near field communication unit, a wireless local area network (WLAN) (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, a microwave (uWave) communication unit, or the like.

The mobile communication unit transmits a radio signal to and receives a radio signal from any one or any combination of a base station, an external terminal, or a server on a mobile communication network. Here, the radio signal may include various types of data according to transmission and reception of a voice call signal, a video call signal, or a text/multimedia message.

The communication interface 1200 according to an embodiment of the disclosure may transmit, to the server 2000, object information recognized by using the first recognition model. The processor 1300 may control the communication interface 1200 to transmit a generated transmit instruction to the model generation server 2000. In this case, information about whether there is a new updated model for the first recognition model may also be transmitted to the model generation server 2000.

The communication interface 1200 according to an embodiment of the disclosure may obtain the second recognition model from the model generation server 2000. In this case, the second recognition model may be transmitted from a memory 2300 of the model generation server 2000 or may be generated by performing new training by using a processor 2200 of the model generation server 2000. Because allocation of the second recognition model is independently determined for each subset space, the second recognition model allocated to each subset space may be different, and thus, at least one second recognition model may be provided.

The processor 1300 may perform overall operations of the electronic device 1000. The processor 1300 may execute one or more instructions of a program stored in the memory, or a plurality of artificial intelligence models (for example, a plurality of recognition models) stored in the memory.

The processor 1300 according to an embodiment of the disclosure may include an application processor (AP), a central processing unit (CPU), a graphic processing unit (GPU), a neural processing unit, an artificial intelligence-dedicated processor designed in a hardware structure specialized for processing of an artificial intelligence model, or the like.

The recognition models executed by the processor 1300 may each include, for example, a neural network-based system (for example, a convolution neural network (CNN), or a recurrent neural network (RNN)), Support Vector Machine (SVM), linear regression, logistic regression, Naïve Bayes classification, a random forest, a decision tree, or a k-nearest neighbor algorithm. Alternatively, the recognition models executed by the processor 1300 may each include a combination of the above-described examples or an artificial intelligence model other than the above-described examples. The recognition models executed by the processor 1300 may be downloaded from the server 2000 to the electronic device 1000 and stored in the memory 1400 of the electronic device 1000. In addition, the recognition models stored in the memory 1400 may be updated.

The processor 1300 according to an embodiment of the disclosure may load and execute the first recognition model stored in the memory 1400, thereby obtaining the first object information by performing object recognition on the whole space.

The processor 1300 according to an embodiment of the disclosure may divide the whole space into the plurality of subset spaces, based on the spatial map and the first object information. The processor 1300 may logically divide the space, based on location information and classification information of objects recognized in the whole space. Because this has been described in detail with reference to FIG. 1, repeated descriptions may be omitted.

The processor 1300 according to an embodiment of the disclosure may perform object recognition on each of the plurality of subset spaces and obtain second object information, by using the second recognition model determined for each of the plurality of subset spaces. For example, the second recognition model which capable of performing classification into subclasses of electronic products, from among the plurality of second recognition models, may be determined to be a recognition model that is to be used in the first subset space. In addition, when the electronic device 1000 moves through the first subset space, the processor 1300 may perform object recognition and obtain the second object information, by using the second recognition model The memory 1400 may store various data, programs, or applications for driving and controlling the electronic device 1000. The program stored in the memory 1400 may include one or more instructions. The program (one or more instructions) or the application stored in the memory 1400 may be executed by the processor 1300.

The memory 1400 according to an embodiment of the disclosure may include any one or any combination of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk. In addition, the electronic device 1000 may operate web storage or a cloud server, which performs a storage function on the Internet.

The memory 1400 according to an embodiment of the disclosure may store the plurality of recognition models. The plurality of recognition models may be received from the model generation server 2000. The first recognition model from among the plurality of recognition models may include, but is not limited to, a model for performing object recognition on the whole space.

The model generation server 2000 according to an embodiment of the disclosure may include, at least, a communication interface 2100, the processor 2200, and the memory 2300.

The communication interface 2100 may include one or more components allowing communication to be performed through a local area network (LAN), a wide area network (WAN), a value-added network (VAN), a mobile radio communication network, a satellite communication network, or a combination thereof.

The communication interface 2100 may receive characteristic information of a subset space, which includes the first object information, from the electronic device 1000, may transmit the second recognition model corresponding to the subset space to the electronic device 1000, and may update the first recognition model by transmitting the first recognition model to the electronic device 1000, as needed.

The processor 2200 may take overall control of the model generation server 2000. The processor 2200 according to an embodiment of the disclosure may execute one or more programs stored in the memory 2300.

The processor 2200 according to an embodiment of the disclosure may include an AP, a CPU, a GPU, a neural processing unit, an artificial intelligence-dedicated processor designed in a hardware structure specialized for processing of an artificial intelligence model, or the like.

The processor 2200 according to an embodiment of the disclosure may generate a plurality of recognition models for recognizing objects. The processor 2200 may generate a recognition model by receiving a training dataset from a data server via the communication interface 2100. In addition, the processor 2200 may train the plurality of recognition models by using different training datasets, wherein types and numbers of classes, which may be classified by the plurality of recognition models, are different from each other. For example, the processor 2200 may train a first recognition model and a second recognition model, wherein the first recognition model provides a greater number of classifiable classes than the second recognition model although providing lower recognition accuracy than the second recognition model.

In this case, the first recognition model may be a model capable of classifying objects into electronic products, clothing, furniture, groceries, toys, cosmetics, and the like respectively corresponding to large categories, to which each recognized class belongs. In addition, the second recognition model may be a model capable of accurately classifying objects into TVs, refrigerators, gas stoves, ovens, washers, dryers, vacuum cleaners, computers, and the like, which respectively correspond to classes. A method, performed by the processor 2200, of generating a recognition model through training will be described in detail with reference to FIG. 10.

The memory 2300 according to an embodiment of the disclosure may store various data, programs, or applications for driving and controlling the model generation server 2000. The program stored in the memory 2300 may include one or more instructions. The program (one or more instructions) or application stored in the memory 2300 may be executed by the processor 2200.

The memory 2300 according to an embodiment of the disclosure may include any one or any combination of a flash memory type storage medium, a hard disk type storage medium, a multimedia card micro type storage medium, card type memory (for example, Secure Digital (SD) memory, eXtreme Digital (XD) memory, or the like), RAM, SRAM, ROM, EEPROM, PROM, magnetic memory, a magnetic disk, or an optical disk.

The memory 2300 according to an embodiment of the disclosure may store the plurality of recognition models that have been trained.

Figure 3:
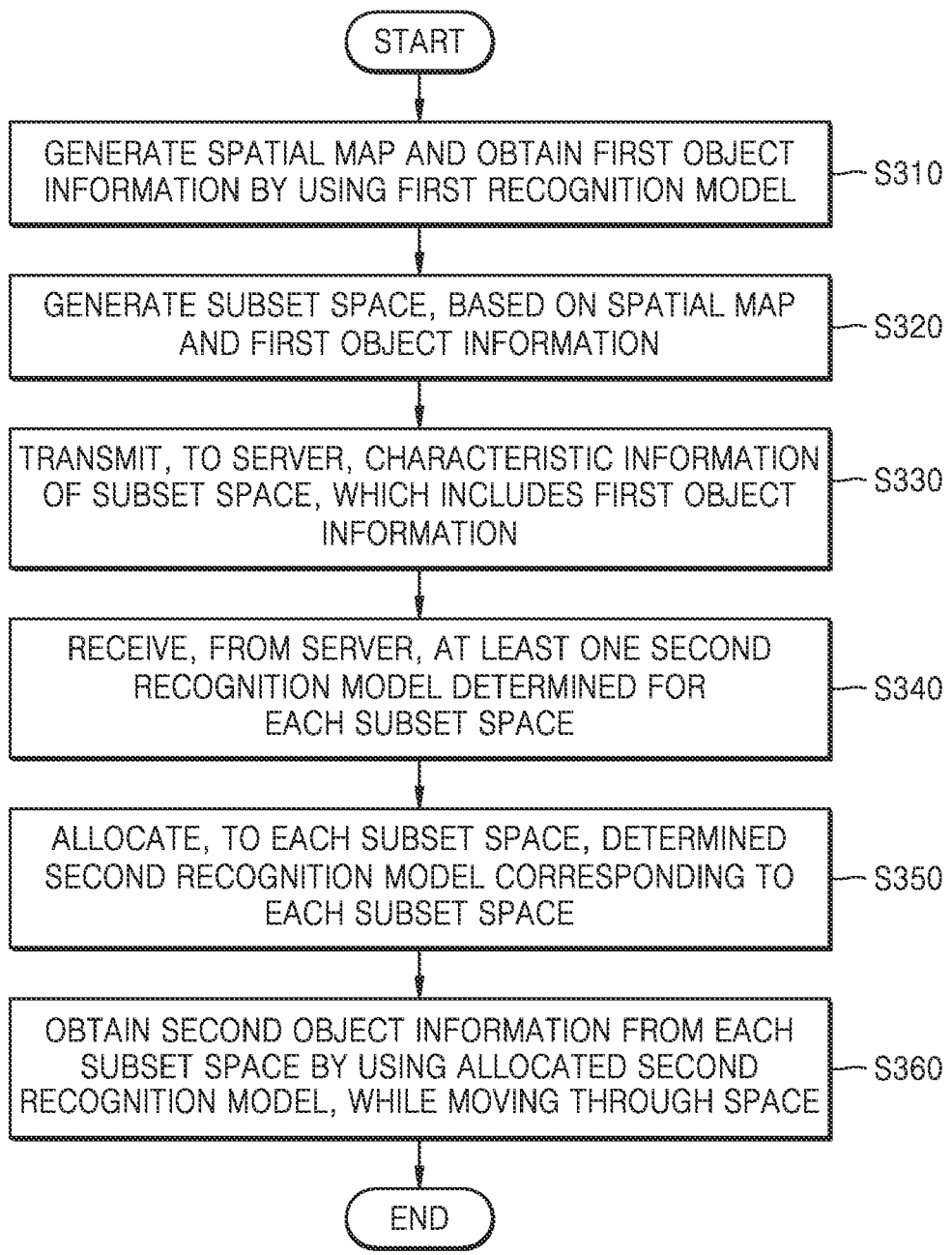
FIG. 3 is a flowchart illustrating an operating method of an electronic device, according to an embodiment of the disclosure.

FIG. 3 is a flowchart illustrating an operating method of an electronic device, according to an embodiment of the disclosure.

In operation S310, while moving through the space, the electronic device 1000 may scan a space by using a sensor(s) and generate a spatial map. By using a first recognition model, the electronic device 1000 may recognize an object after the generation of the spatial map or in parallel with a process of generating the spatial map, and may obtain first object information.

In operation S320, the electronic device 1000 may divide the space into a plurality of subset spaces, based on the spatial map and the obtained first object information.

For example, the electronic device 1000 may logically divide the space, based on object information of objects (for example, location information and classification information of the objects) recognized throughout the space. A method, performed by an electronic device, of dividing a space into a plurality of subset spaces will be described in detail with reference to FIGS. 5 to 8.

When the generation of the subset spaces is completed in operation S320, the electronic device 1000 may extract characteristic information of each subset space from a first object information cluster of objects in each subset space.

The electronic device 1000 may determine a second recognition model, which is to be used in each of the plurality of subset spaces, from among a plurality of second recognition models that are pre-stored, based on the characteristic information of each of the plurality of subset spaces. Here, the second recognition models may exhibit higher accuracy than the first recognition model although including smaller numbers of classes of recognizable objects than the first recognition model, which is used to obtain the object information (first object information) in the whole space.

Alternatively, the electronic device 1000 may transmit the characteristic information of the subset spaces to the model generation server 2000 and may request the second recognition model corresponding to each of the subset spaces from the model generation server 2000.

In operation S330, the electronic device 1000 may transmit the characteristic information of a subset space, which includes the first object information, to the model generation server 2000. The characteristic information of the subset space may be determined from the first object information cluster of objects included in the subset space. For example, for a first subset space, the characteristic information of the first subset space may be transmitted to the model generation server 2000, the characteristic information including large category information of objects included in the first subset space, location information of the objects, the number of objects, and proportions of object classes belonging to each large category.

In operation S340, the electronic device 1000 may receive the second recognition model determined for performing object recognition on each subset space, from the model generation server 2000.

For example, the model generation server 2000 may determine a recognition model corresponding to each subset space from among the second recognition models including at least one recognition model, based on the characteristic information of each subset space. In this case, when the recognition model corresponding to each subset space is not pre-stored in the model generation server 2000, the model generation server 2000 may generate the recognition model through training and include the recognition model as a second recognition model. The electronic device 1000 may receive the determined or generated second recognition model from the model generation server 2000.

In operation S350, the electronic device 1000 may allocate the determined second recognition model corresponding to each subset space, out of at least one second recognition model received from the model generation server 2000, to each subset subspace. The second recognition model allocated to each subset space may be identical or different.

For example, the electronic device 1000 may determine the second recognition model that is to be used in each of the plurality of subset spaces, based on the characteristic information of each of the plurality of subset spaces. When a number of objects or more out of objects included in the first subset space from among the plurality of subset spaces are classified into electronic products, the electronic device 1000 may allocate the second recognition model, which is capable of performing classification into classes belonging to electronic products, to the first subset space. In this case, a plurality of second recognition models may be provided, and the number of classifiable classes or recognition accuracy of each of the plurality of second recognition models may be different. A method, performed by the electronic device 1000, of determining and allocating the second recognition model, which is to be used in each of the plurality of subset spaces, will be described in detail with reference to FIG. 9.

In operation S360, the electronic device 1000 may perform object recognition and obtain second object information, by using the second recognition model allocated to each of the plurality of subset spaces, while moving through the first subset space.

For example, while moving through the first subset space, the electronic device 1000 may perform object recognition and obtain the second object information, by using the second recognition model allocated to the first subset space. In addition, the electronic device 1000 may move to a second subset space, and then, the electronic device 1000 may perform object recognition and obtain the second object information, by using the second recognition model allocated to the second subset space. In this case, the second recognition model allocated to each subset space may be identical or different. In addition, for the remaining subset spaces, in the same manner, the electronic device 1000 may load a recognition model, perform object recognition, and obtain the second object information.

FIGS. 4 to 9 are diagrams illustrating a method of generating a plurality of subset spaces by dividing a whole space, according to an embodiment of the disclosure.

FIG. 4 is a diagram illustrating first object information obtained by an electronic device by using a first recognition model, according to an embodiment of the disclosure.

The table of FIG. 4 shows the first object information obtained for objects in a space by using the first recognition model. In this case, although object numbers may be given in the order of recognizing objects by the electronic device 1000, the disclosure is not limited thereto.

Referring to the table of FIG. 4, the electronic device 1000 according to an embodiment of the disclosure may obtain the first object information about objects in the whole space, by using the first recognition model. For example, when objects, such as a TV, a washer, a refrigerator, a dryer, a monitor, a computer, a cellular phone, an apple, a banana, and milk, are present in the whole space, the electronic device 1000 may obtain both location information of each of the objects and classification information of each of the objects by using the first recognition model. Here, the classification information of each of the objects may be sketchy classification information (for example, large category information) thereof. By using the first recognition model, the electronic device 1000 may classify the TV, the washer, the refrigerator, the dryer, the monitor, the computer, and the cellular phone into "electronic products" and may classify the apple, the banana, and the milk into "groceries."

The accuracy of the classification information of the objects, which is obtained by the electronic device 1000 according to an embodiment of the disclosure by using the first recognition model, may be lower than the accuracy of the classification information of the objects, which is obtained by using a second recognition model. For example, by using the first recognition model, the electronic device 1000 may classify the TV, the monitor, and the computer into "TVs," may classify the washer and the dryer into "washers," and may classify the apple and the banana into "fruits."

Figure 5:
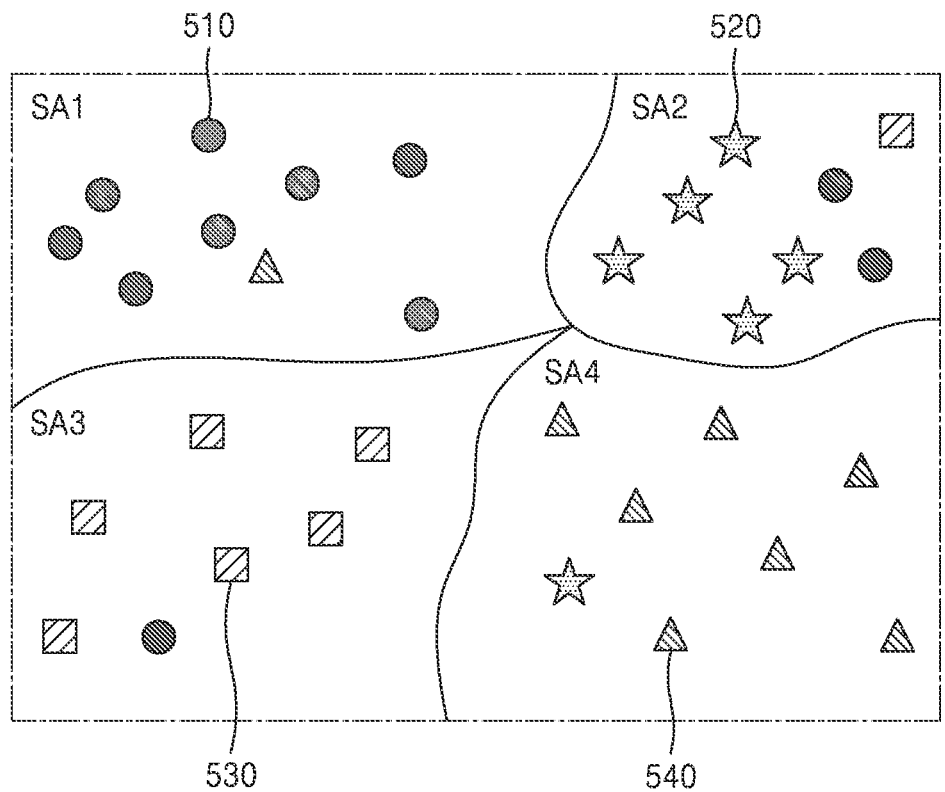
FIG. 5 is a diagram illustrating a method, performed by an electronic device, of dividing a whole space into a plurality of subset spaces, according to an embodiment of the disclosure.

FIG. 5 is a diagram illustrating a method of an electronic device dividing a whole space into a plurality of subset spaces, according to an embodiment of the disclosure.

Referring to FIG. 5, the first object information obtained by the electronic device 1000 according to an embodiment of the disclosure by using the first recognition model may be displayed on a spatial map for the whole space. In this case, a location of a displayed mark may be determined based on the location information included in the first object information. In addition, a shape of the displayed mark may be determined based on the classification information (for example, large category information) included in the first object information. For convenience of description, FIG. 5 illustrates an example, in which an object belonging to an "electronic product" category is indicated by a circle-shaped mark, an object belonging to a "clothing" category is indicated by a star-shaped mark, an object belonging to a "grocery" category is indicated by a quadrangle-shaped mark, and an object belonging to a "furniture" category is indicated by a triangle-shaped mark.

For example, as shown in FIG. 5, when the electronic device 1000 recognizes an object belonging to the "electronic product" category at a first location by using the first recognition model, a circle-shaped mark 510 may be made at the first location. In addition, when the electronic device 1000 recognizes an object belonging to the "clothing" category at a second location by using the first recognition model, a star-shaped mark 520 may be made at the second location. Further, when the electronic device 1000 recognizes an object belonging to the "grocery" category at a third location by using the first recognition model, a quadrangle-shaped mark 530 may be made at the third location. Furthermore, when the electronic device 1000 recognizes an object belonging to the "furniture" category at a fourth location by using the first recognition model, a triangle-shaped mark 540 may be made at the fourth location.

The electronic device 1000 according to an embodiment of the disclosure may divide the whole space into a plurality of subset spaces, wherein objects recognized as belonging to the same large category are present in a proportion or more in each of the plurality of subset spaces. In addition, the electronic device 1000 may determine the shape and area of each of the plurality of subset spaces, a boundary line between the plurality of subset spaces, and the like by using various algorithms or using a neural network model.

For example, as shown in FIG. 5, the electronic device 1000 may divide the whole space into first to fourth subset spaces SA1, SA2, SA3, and SA4. In this case, objects belonging to the "electronic product" category may be present in a proportion or more in the first subset space SA1, objects belonging to the "clothing" category may be present in a proportion or more in the second subset space SA2, objects belonging to the "grocery" category may be present in a proportion or more in the third subset space SA3, and objects belonging to the "furniture" category may be present in a proportion or more in the fourth subset space SA4.

In another embodiment of the disclosure, when the electronic device 1000 divide the whole space, the electronic device 1000 may divide the space into the plurality of subset spaces, based on the spatial map and the number of classes into which objects recognized in the space are classified, wherein objects less than or equal to a number of classes are included in each subset space.

For example, when the electronic device 1000 has recognized 1090 object classes in the space, the electronic device 1000 may set a maximum number of object classes, which are allowed to be included in one subset space, to 100. Based on the total number, 1090, of object classes recognized, the electronic device 1000 may divide the spatial map into 11 subset spaces, wherein 100 object classes are included in each of 10 subset spaces and 90 object classes are included in the remaining one subset space. When performing division into subset spaces, the electronic device 1000 may arbitrarily determine the maximum number of object classes, which are allowed to be included in each subset space, and it is not necessary to perform the division in such a manner that each subset space completely includes the maximum number of object classes.

Figure 6:
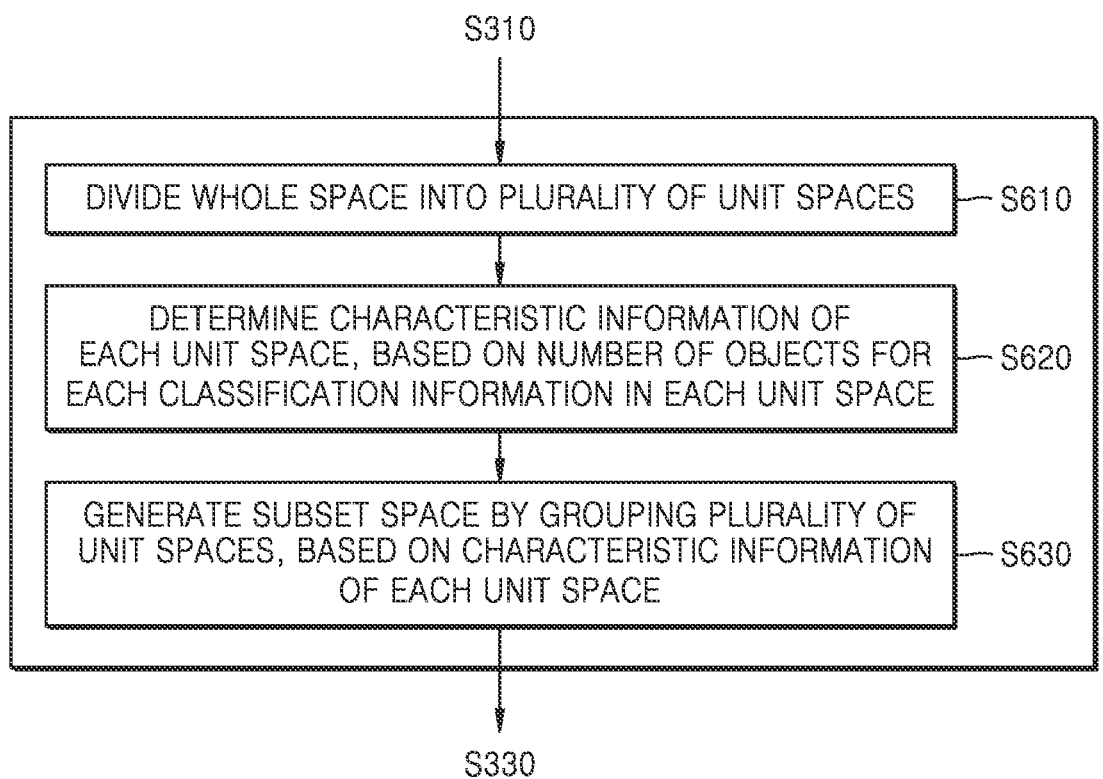
FIG. 6 is a flowchart illustrating a method, performed by an electronic device, of dividing a whole space into a plurality of subset spaces, according to an embodiment of the disclosure.
Figure 7:
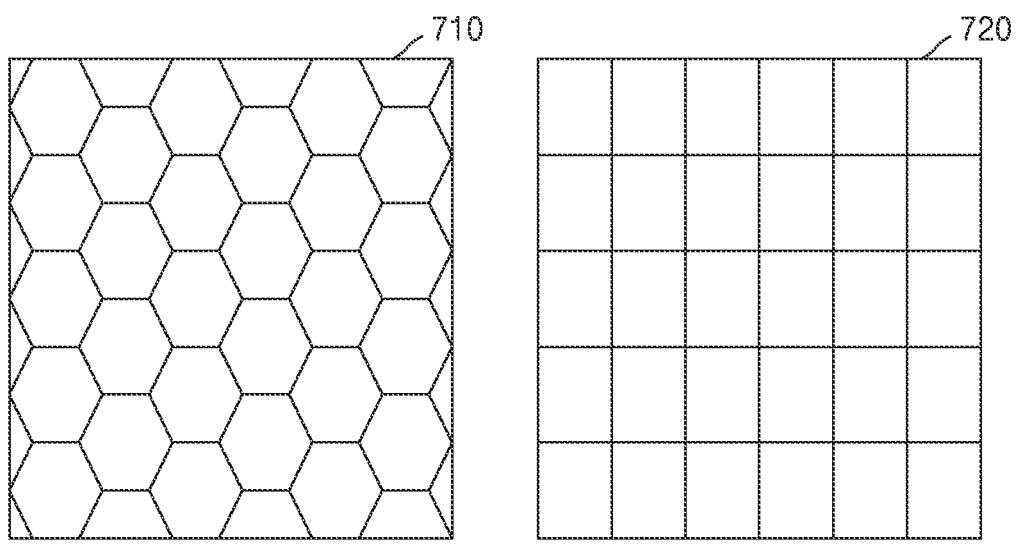
FIG. 7 is a diagram illustrating a method of an electronic device dividing a whole space into a plurality of unit spaces, according to an embodiment of the disclosure.
Figure 8:
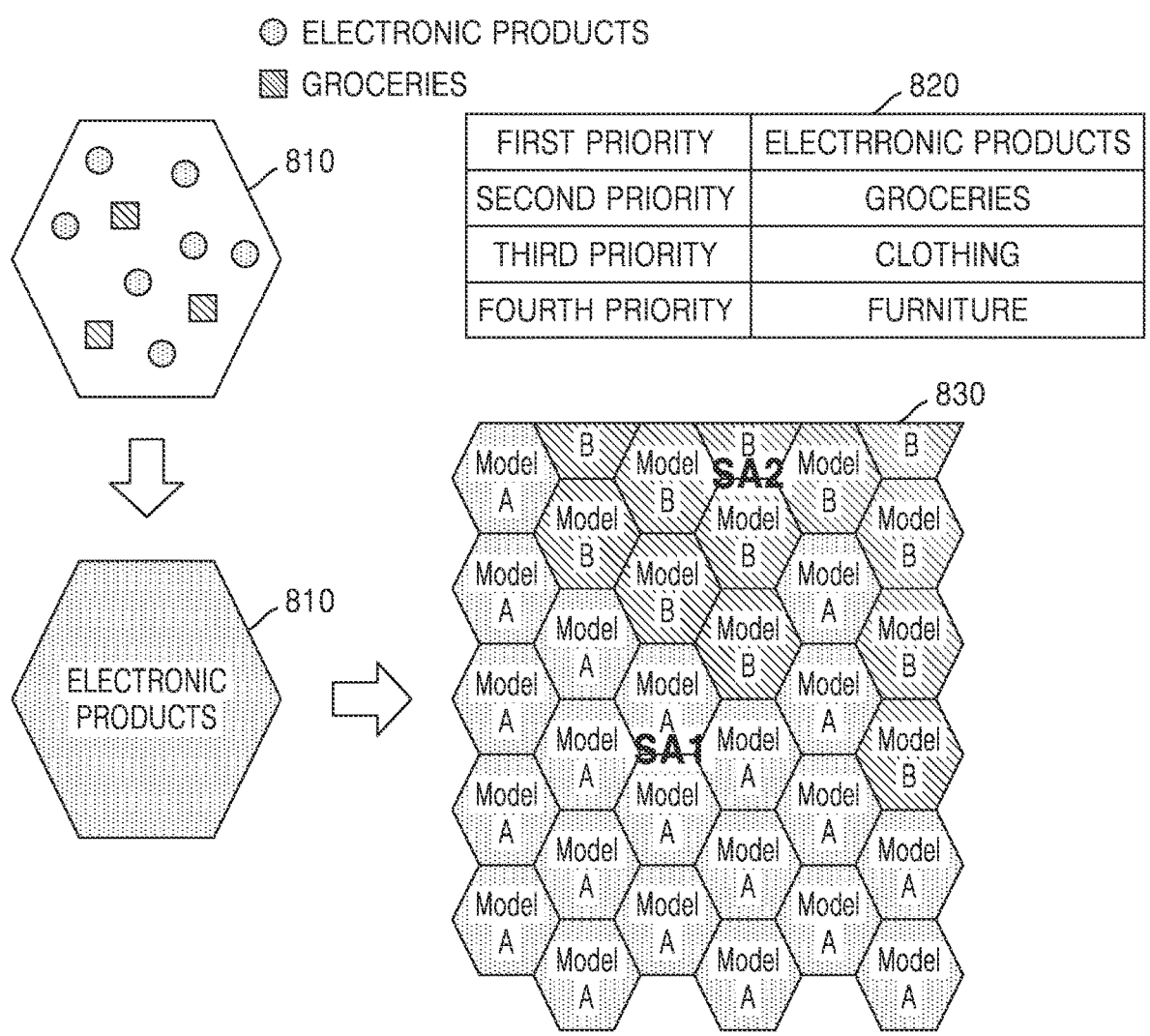
FIG. 8 is a diagram illustrating a method, performed by an electronic device, of generating a plurality of subset spaces by grouping a plurality of unit spaces, according to an embodiment of the disclosure.
Figure 9:
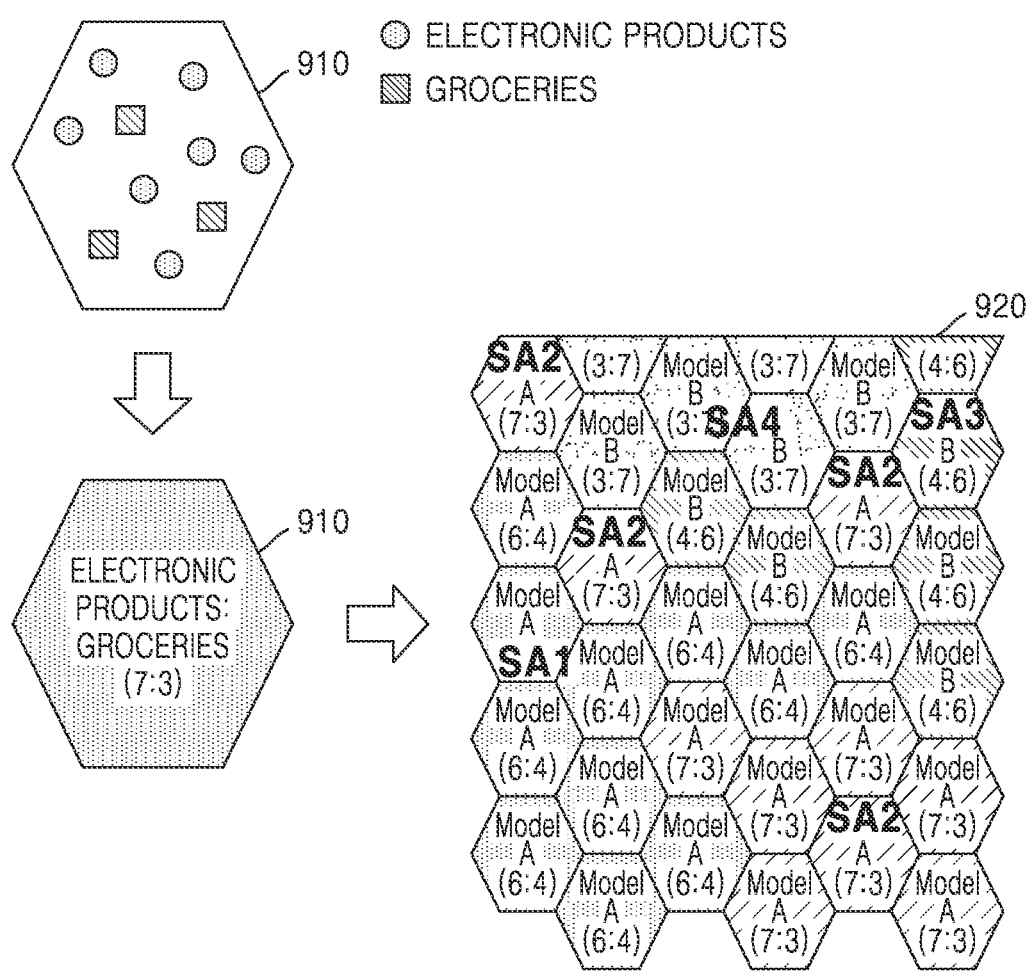
FIG. 9 is a diagram illustrating another method, performed by an electronic device, of generating a plurality of subset spaces by grouping a plurality of unit spaces, according to an embodiment of the disclosure.

FIG. 6 is a flowchart illustrating a method of electronic device dividing a whole space into a plurality of subset spaces, according to an embodiment of the disclosure. FIG. 7 is a diagram illustrating a method of an electronic device dividing a whole space into a plurality of unit spaces, according to an embodiment of the disclosure. FIG. 8 is a diagram illustrating a method of an electronic device generating a plurality of subset spaces by grouping a plurality of unit spaces, according to an embodiment of the disclosure. FIG. 9 is a diagram illustrating another method of an electronic device generating a plurality of subset spaces by grouping a plurality of unit spaces, according to an embodiment of the disclosure.

Operations shown in FIG. 6 may be included in operation S320 of FIG. 3.

Referring to FIG. 6, in operation S610, the electronic device 1000 according to an embodiment of the disclosure may divide a whole space into a plurality of unit spaces, based on a spatial map. A method, performed by the electronic device 1000, of performing division into the plurality of unit spaces will be described with reference to FIG. 7.

In operation S620, the electronic device 1000 may determine characteristic information of each unit space, based on the number of objects for each piece of classification information in each of the plurality of unit spaces.

In operation S630, the electronic device 1000 may generate a subset space by grouping the plurality of unit spaces, based on the characteristic information of each of the plurality of unit spaces. A method, performed by the electronic device, of generating the subset space by determining the characteristic information of each unit space and grouping the unit spaces will be described with reference to FIGS. 8 and 9.

Referring to FIG. 7, the whole space may be divided into the plurality of unit spaces having the same area and shape. For example, the whole space may be divided into hexagon-shaped unit spaces 710. In another example, the whole space may be divided into quadrangle-shaped unit spaces 720.

The unit spaces may have various shapes in addition to the polygonal shapes set forth above, and the area and shape of each of the unit spaces may vary based on both a structure of a space included in the generated spatial map and the first object information. For example, even after the space has been divided into the hexagon-shaped unit spaces 710, the space may be changed to be divided into the quadrangle-shaped unit spaces 720 by considering location information included in the first object information. The size of each unit space may be set to be small or large by considering the number of objects in each unit space.

Based on the number of objects for each piece of classification information (large category) in each of the unit spaces, the electronic device 1000 may determine a piece of classification information, which has a largest number of objects therein, to be characteristic information of the corresponding unit space.

Referring to FIG. 8, the electronic device 1000 may determine the characteristic information of each unit space, based on the classification information and the location information included in the first object information. Hereinafter, for convenience of description, descriptions will be made by taking an example, in which the objects in the whole space are classified into "electronic products" or "groceries."

For example, referring to FIG. 8, when objects recognized in a first unit space 810 includes seven objects belonging to the "electronic product" category and three objects belonging to the "grocery" category, the electronic device 1000 may determine characteristic information of the first unit space 810 as being "electronic products" and thus determine the corresponding unit space to be a space representatively corresponding to "electronic products."

Alternatively, when there are a plurality of pieces of classification information having a largest number of objects therein, the electronic device 1000 may determine the characteristic information of each unit space, based on priority information. For example, unlike the example shown in FIG. 8, the objects recognized in the first unit space 810 may include, equally in number, five objects belonging to the "electronic product" category and five objects belonging to the "grocery" category. In this case, because the priority of "electronic products" is higher than the priority of "groceries" according to priority information 820 of FIG. 8, the electronic device 1000 may determine the characteristic information of the first unit space 810 as being "electronic products" and thus determine the corresponding unit space to be a space representatively corresponding to "electronic products."

The electronic device 1000 may determine the characteristic information of each of the plurality of unit spaces in the same manner as described above, and may group unit spaces having the same characteristic information into one subset space.

For example, as shown in FIG. 8, unit spaces having characteristic information of "electronic products" may be grouped into the first subset space SA1, and unit spaces having characteristic information of "groceries" may be grouped into the second subset space SA2, thereby generating subset spaces 830.

In each subset space, the electronic device 1000 may determine the characteristic information of each subset space from the first object information cluster of objects included in each subset space.

Referring to FIG. 9, the electronic device 1000 may determine the characteristic information of each unit space, based on the classification information and the location information included in the first object information. Based on proportions of pieces of classification information (large categories) of objects in each of the unit spaces, the characteristic information of the corresponding unit space may be determined.

For example, referring to FIG. 9, when objects recognized in a first unit space 910 include seven objects belonging to the "electronic product" category and three objects belonging to the "grocery" category, the electronic device 1000 may determine characteristic information of the first unit space 910 as being "electronic products and groceries are present in a ratio of 7:3" and thus determine the corresponding unit space to be a space corresponding to "electronic products" and "groceries." Alternatively, unlike the example shown in FIG. 9, when the objects recognized in the first unit space 910 include six objects belonging to the "electronic product" category and four objects belonging to the "grocery" category, the electronic device 1000 may determine the characteristic information of the first unit space 910 as being "electronic products and groceries are present in a ratio of 6:4" and thus determine the corresponding unit space to be a space corresponding to "electronic products" and "groceries."

The electronic device 1000 may determine the characteristic information of each of the plurality of unit spaces in the same manner as described above, and may group unit spaces having the same or similar characteristic information into one subset space.

For example, as shown in FIG. 9, the electronic device 1000 may group unit spaces having the same characteristic information. The electronic device 1000 may generate the subset spaces 920 by determining unit spaces in which "electronic products" and "groceries" are present in a ratio of 7:3, as the first subset space SA1, determining unit spaces in which "electronic products" and "groceries" are present in a ratio of 6:4, as the second subset space SA2, determining unit spaces in which "electronic products" and "groceries" are present in a ratio of 4:6, as the third subset space SA3, and determining unit spaces in which "electronic products" and "groceries" are present in a ratio of 3:7, as the four subset space SA4.

In another example, the electronic device 1000 may group unit spaces having similar characteristic information by setting a reference value and a margin of error. For example, when there are a first unit space, in which "electronic products" and "groceries" are present in a ratio of 80:20, and a second unit space, in which "electronic products" and "groceries" are present in a ratio of 77:23, and a set margin of error is 5% or less, the electronic device 1000 may determine a ratio of characteristic information that is a reference to 80:20, and the electronic device 1000 may group the second unit space having similar characteristic information within the margin of error and the first unit space into the same subset space, that is, the first subset space SA1.

When the first to fourth subset spaces 920 are determined by the method described with reference to FIG. 9, the number of subsets determined may be increased as compared with the example of determining the first and second subset spaces 830 by the method described with reference to FIG. 8. In this case, because the number of second recognition models corresponding to the number of increased subset spaces is also increased, the memory 1400 of the electronic device 1000 and the memory 2300 of the model generation server 2000 may each include a mass storage device for storing a large number of second recognition models.

Although the example, in which the plurality of unit spaces have hexagonal shapes, has been described with reference to FIGS. 8 and 9 for convenience of description, the disclosure is not limited thereto, and the method described with reference to FIGS. 8 and 9 may also be equally applied to the plurality of unit spaces having shapes other than the hexagonal shapes.

Although the method of generating the plurality of subset spaces by dividing the whole space, according to an embodiment of the disclosure, has been described with reference to FIGS. 4 to 9, the disclosure is not limited to the example described above, and the subset spaces may be generated in various manners.

Figure 10A:
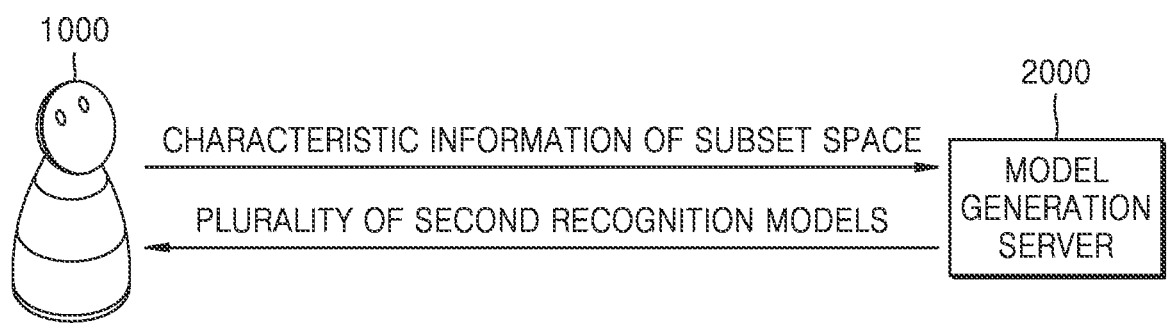
FIG. 10A is a diagram illustrating transmission and reception of data between an electronic device and a model generation server, according to an embodiment of the disclosure.

FIG. 10A is a diagram illustrating transmission and reception of data between an electronic device and a model generation server, according to an embodiment of the disclosure.

Referring to FIG. 10A, the electronic device 1000 may transmit characteristic information of the subset spaces to the model generation server 2000 and may request the second recognition models respectively corresponding to the subset spaces from the model generation server 2000. The electronic device 1000 may store, in a memory, the second recognition models received from the model generation server 2000.

Figure 10B:
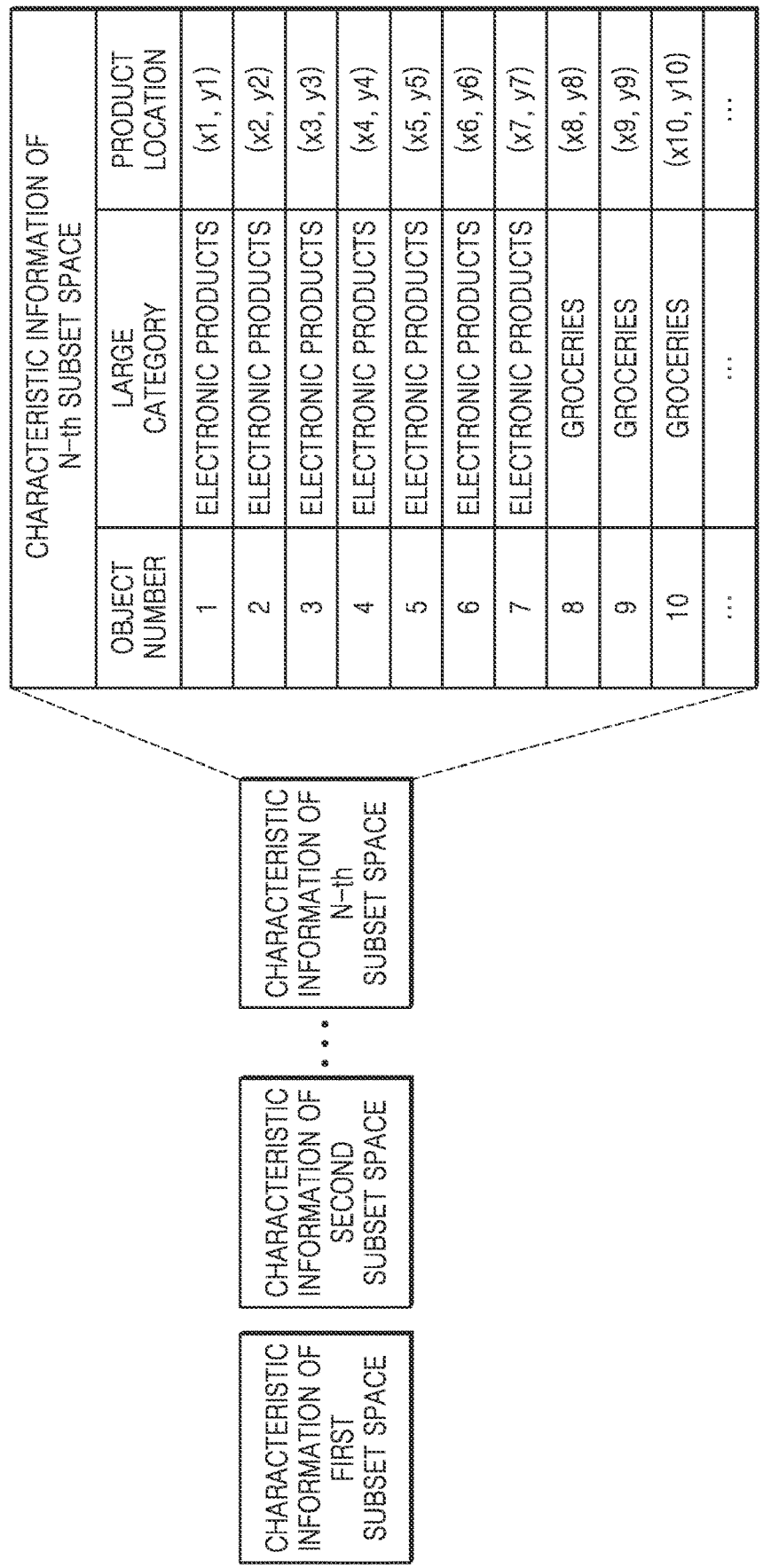
FIG. 10B is a diagram illustrating characteristic information of a subset space that is transmitted from an electronic device to a model generation server, according to an embodiment of the disclosure.

FIG. 10B is a diagram illustrating characteristic information of a subset space that is transmitted from an electronic device to a model generation server, according to an embodiment of the disclosure. For first to $N^{th}$ subset spaces obtained by dividing a whole space, the electronic device 1000 may determine characteristic information of each subset space from a first object information cluster of objects included in each subset space. The characteristic information of each subset space may include first object information of the objects in each subset space and may include the number of objects in each subset space and a proportion of classes of objects belonging to each large category.

Hereinafter, for convenience of description, descriptions will be made by taking an example in which objects in the whole space are classified into "electronic products" or "groceries."

Figure 10C:
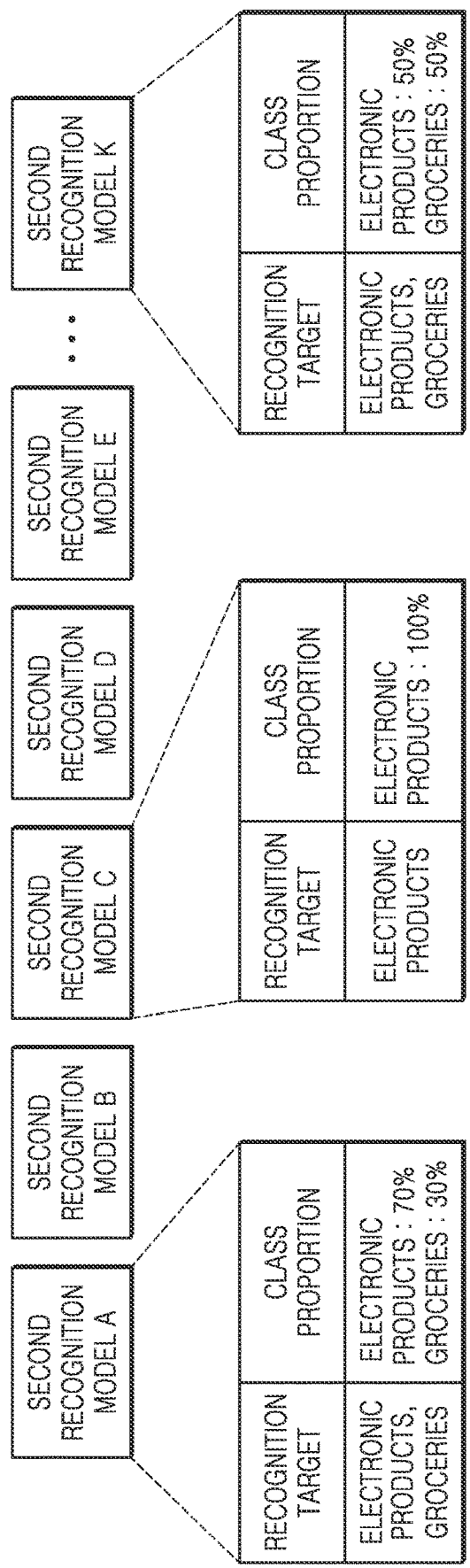
FIG. 10O is a diagram illustrating a plurality of second recognition models that is stored in an electronic device or a model generation server, according to an embodiment of the disclosure.
FIG. 10D is a diagram illustrating a method, performed by an electronic device, of determining a second recognition model to be used in each of subset spaces among a plurality of recognition models, based on characteristic information of each of the subset spaces, according to an embodiment of the disclosure.

FIG. 10C is a diagram illustrating a plurality of second recognition models that is stored in an electronic device or a model generation server, according to an embodiment of the disclosure. A second recognition model may be a recognition model that is trained to more finely recognize objects belonging to a certain category to obtain more accurate object information than the first recognition model. For example, the plurality of second recognition models (for example, a second recognition model A, a second recognition model B, . . . , and a second recognition model K) may be recognition models suitable to recognize electronic products or groceries. In this case, the second recognition model A may recognize "electronic products" and "groceries," and may be a recognition model trained by using a training dataset that includes "electronic products" and "groceries" in a ratio of 7:3, during the generation of the recognition model. In addition, the second recognition model C may recognize "electronic products," and may be a recognition model trained by using a training dataset that includes only "electronic products," during the generation of the recognition model. Further, the second recognition model K may recognize "electronic products" and "groceries," and may be a recognition model trained by using a training dataset that includes "electronic products" and "groceries" in a ratio of 5:5, during the generation of the recognition model.

The second recognition model may be updated through training by the model generation server 2000, and this will be described in detail with reference to FIG. 12.

FIG. 10D is a diagram illustrating a method of an electronic device or a model generation server determining a second recognition model to be used in each of subset spaces among a plurality of recognition models, based on characteristic information of each of the subset spaces, according to an embodiment of the disclosure.

Referring to FIG. 10D, the memory 2300 of the model generation server 2000 may store a plurality of second recognition models (for example, a second recognition model A, a second recognition model B, . . . , and a second recognition model K). The model generation server 2000 may determine the second recognition model to be allocated to each subset space, based on the characteristic information of each subset space generated by the method of FIGS. 5 to 9, or the like.

In an embodiment of the disclosure, the model generation server 2000 may determine the second recognition model, based on the characteristic information of the subset spaces 830 of FIG. 8. For example, a first subset space may be a subset space generated by grouping together unit spaces, each having characteristic information determined to be "electronic products." In this case, the model generation server 2000 may determine the second recognition model, which is to be allocated to the first subset space, to be the "second recognition model E" that recognizes only electronic products.

In another embodiment of the disclosure, the model generation server 2000 may determine the second recognition model by additionally using the priority information 820 of FIG. 8. For example, when, although characteristic information of a second subset space is determined to be representatively "electronic products," "groceries" are also present in a number or more in the second subset space, the model generation server 2000 may determine the second recognition model, which is to be allocated to the second subset space, to be a plurality of second recognition models, that is, both the "second recognition model E," which recognizes only electronic products, and the "second recognition model F," which recognizes only groceries. In the case in which a plurality of recognition models are allocated to a subset space, when the electronic device 1000 recognizes objects in the subset space, the electronic device 1000 may recognize the objects by using the plurality of recognition models in parallel or by sequentially using the plurality of recognition models.

In another embodiment of the disclosure, the model generation server 2000 may determine the second recognition model, based on the characteristic information of the subset spaces 920 of FIG. 9. For example, a third subset space may be generated by grouping together unit spaces having the same characteristic information, which indicates that "electronic products" and "groceries" are present in a ratio of 6:4 in each unit space. In this case, the model generation server 2000 may determine the second recognition model, which is to be allocated to the third subset space, to be the "second recognition model B" that is trained to recognize electronic products and groceries by considering the ratio (6:4) set forth above.

In another example, a fourth subset space may be generated by grouping together unit spaces having similar characteristic information, which indicates that the proportion of electronic products in each unit space is higher than the proportion of groceries therein. In this case, by considering the proportions set forth above, the model generation server 2000 may determine the second recognition model, which is to be allocated to the fourth subset space, to be a recognition model trained under a training condition in which the proportion of electronic-product classes is higher than the proportion of grocery classes. The model generation server 2000 may determine the "second recognition model A" or the "second recognition model B," for the fourth subset space. Alternatively, the model generation server 2000 may determine both the "second recognition model A" and the "second recognition model B," for the fourth subset space.

Although, in the above-described embodiments, the method of determining the second recognition models, which correspond to the subset spaces generated by the method of FIGS. 5 to 9, has been described by taking the first to fourth subset spaces as examples, the model generation server 2000 may also determine the second recognition model to be allocated to each of the remaining subset spaces, in the same manner as described above. However, determining the second recognition model, which is to be allocated to a subset space, is not limited to being performed by the model generation server 2000, and the electronic device 1000 may determine the second recognition model, which is to be used in each of the plurality of subset spaces, from among the plurality of recognition models stored in the memory in the electronic device 1000, based on the characteristic information of each subset space.

FIG. 11 is a flowchart illustrating operations of an electronic device for operating recognition models, according to an embodiment of the disclosure.

In operation S1110, the electronic device 1000 may determine whether a space scan is needed. For example, a spatial map, first object information, and subset space information, which have been obtained by performing, by the electronic device 1000, an initial space scan on a space, may have already been in the memory 1400 of the electronic device 1000. In this case, because there is no need to separately obtain the first object information and separately generate subset spaces, the electronic device 1000 may perform operation S1115.

In operation S1115, the electronic device 1000 may determine whether there is a second recognition model determined for each of the existing subset spaces. For example, the electronic device 1000 may be in an environment in which the electronic device 1000 is not allowed to communicate with the model generation server 2000 via the communication interface 1200. In this case, the electronic device 1000 may perform only up to operation S1130 of generating the subset spaces, and then, may store the subset space information.

When there is no second recognition model determined for each subset space, the electronic device 1000 may proceed to operation S1140 to determine the second recognition model that is to be allocated to each subset space.

When there is a second recognition model determined for each subset space, the electronic device 1000 may proceed to operation S1170 and obtain second object information by operating the second recognition model allocated to each subset space.

In addition, in operation S1110, the electronic device 1000 may check whether there is a change in space information, and may determine that there may be a need to update the spatial map, the first object information, the subset space information, or the like. For example, after the generation of the subset spaces and the determination of the second recognition models are completed, the electronic device 1000 may obtain the second object information while moving through the space (operation S360 of FIG. 3 or operation S1170 of FIG. 11). During the process of performing object recognition by the electronic device 1000, a structural change in the space, or the like may be sensed by the sensor(s) 1100, or information indicating that the characteristic of the space has been changed by an input by a user, or the like may be obtained. When an update is needed due to a change in the space information, the electronic device 1000 may update the space information by performing operation S1120 again.

Referring again to operation S1110, the electronic device 1000 may determine that a space scan is needed because the initial space scan is not performed. In this case, the electronic device 1000 may perform operation S1120.

Because operations S1120 to S1170 respectively correspond to operations S310 to S360 of FIG. 3, repeated descriptions thereof may be omitted.

FIG. 12 is a swim lane diagram illustrating operations of an overall system of an electronic device, a model generation server, and a data server, according to an embodiment of the disclosure.

As used herein, the term "class" refers to a classification unit for a recognition model to recognize and classify an object. The recognition model may be generated through training by using a training dataset labeled with each class to classify images, and the generated recognition model may classify a recognized object into a class. The recognition model may be trained by taking various pieces of information as classes, and thus, classes, into which objects are recognized and classified, may vary for each recognition model. For example, when the recognition model is for performing classification into large categories, the recognition model may be trained by taking, as class information, large category information, which is classification information included in object information. In this case, the classes may respectively include an "electronic product" class, a "furniture" class, a "grocery" class, a "clothing" class, and the like. In another example, when the recognition model is for performing classification into small categories, the recognition model may be trained by taking, as the class information, small category information, which is classification information included in the object information. In this case, the classes may respectively include "TVs," "refrigerators," "computers," "beds," "chairs," "milk," and the like. However, the disclosure is not limited to the examples set forth above.

The above-described classes are provided as examples, the recognition model may be configured and generated with various classes to classify objects into classes, which are classification units, and the electronic device 1000 may perform object recognition and obtain the object information, by using the recognition model. In this case, when the recognition model obtains the classification information included in the object information, the recognition model may obtain only one (a large category, a medium category, or a small category) of pieces of classification information or may simultaneously obtain one or more of the pieces of classification information.

Because operations S1200, S1210, and S1215 respectively correspond to operations S310 to S330 of FIG. 3, repeated descriptions thereof may be omitted.

In operation S1220, the model generation server 2000 may determine the second recognition model corresponding to each of the subset spaces. The model generation server 2000 may check whether there is a recognition model corresponding to each subset space in a plurality of second recognition models stored in the memory of the model generation server 2000, based on characteristic information of each subset space, which is received from the electronic device 1000. As a result of the check, when there is a corresponding second recognition model, the model generation server 2000 may proceed to operation S1245 and transmit the corresponding second recognition model to the electronic device 1000. As a result of the check, when there is no second recognition model, the model generation server 2000 may proceed to operation S1225 to generate the second recognition model, which is determined in operation S1220, through training.

In operation S1225, to generate a new second recognition model, the model generation server 2000 may request, from a data server 3000, a training dataset suitable for the second recognition model determined in operation S1220.

For example, when the determined second recognition model is a model for recognizing "electronic products," in consideration thereof, the model generation server 2000 may request the training dataset from the data server 3000. The model generation server 2000 may request the training dataset which includes only pieces of image data labeled with classes belonging to electronic products such as "TVs," "refrigerators," "computers," "washers," and "dryers," from the data server 3000.

In another example, when characteristic information of a subset space indicates that 70% of objects in the subset space belong to "electronic products" and 30% thereof belong to "furniture," the model generation server 2000 may request the training dataset from the data server 3000 in consideration thereof. The model generation server 2000 may request the training dataset, which includes 70% image data labeled with classes belonging to electronic products and 30% image data labeled with classes belonging to furniture, from the data server 3000.

In operation S1230, the data server 3000 may generate a training image dataset corresponding to the request in operation S1225, from image databases in a storage device thereof.

In operation S1235, the model generation server 2000 may receive the generated training image dataset.

In operation S1240, the model generation server 2000 may generate the second recognition model, which is determined in operation S1220, through training by using the training image dataset generated in operation S1230.

Because operations S1245, S1250, and S1260 respectively correspond to operations S340 to S360 of FIG. 3, repeated descriptions thereof may be omitted.

Figure 13:
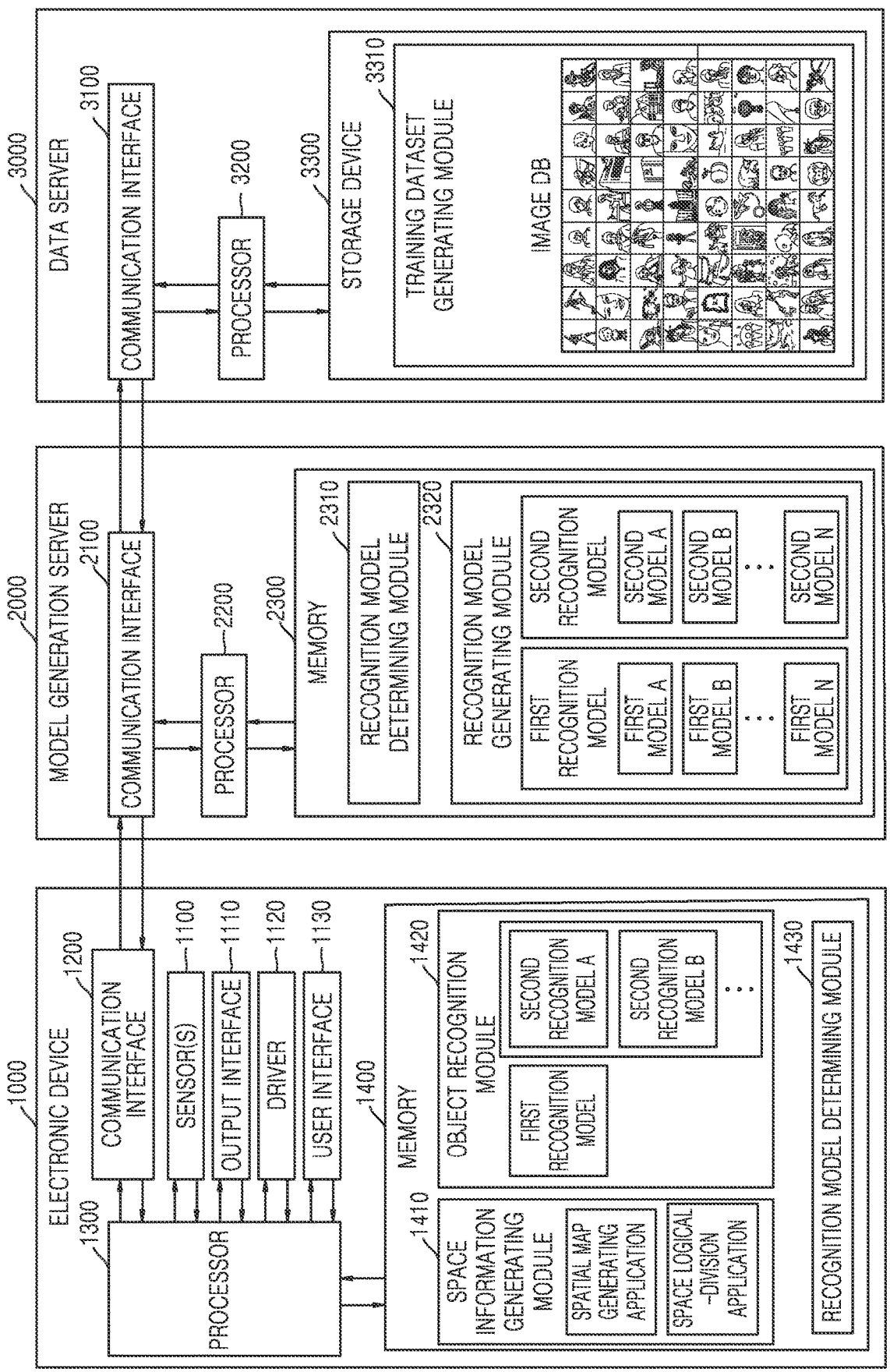
FIG. 13 is a block diagram, which is provided for reference with descriptions of FIG. 12, illustrating an overall configuration of an electronic device, a model generation server, and a data server, according to an embodiment of the disclosure.

FIG. 13 is a block diagram, which is provided for reference with descriptions of FIG. 12, illustrating an overall configuration of an electronic device, a model generation server, and a data server, according to an embodiment of the disclosure.

The electronic device 1000 according to an embodiment of the disclosure may include the sensor(s) 1100, an output interface 1110, a driver 1120, a user interface 1130, the communication interface 1200, the processor 1300, and the memory 1400.

Because the sensor(s) 1100, the communication interface 1200, the processor 1300, and the memory 1400 in FIG. 13 respectively correspond to the sensor(s) 1100, the communication interface 1200, the processor 1300, and the memory 1400 in FIG. 2, repeated descriptions thereof may be omitted.

The output interface 1110 according to an embodiment of the disclosure is for outputting audio signals or video signals and may include, but is not limited to, a speaker, a display, or the like.

The speaker of the output interface 1110 may output audio data received from the communication interface 1200 or stored in the memory 1400. In addition, the speaker of the output interface 1110 may output sound signals related to functions performed by the electronic device 1000.

The display of the output interface 1110 may display information processed by the electronic device 1000. For example, the display may display, but is not limited to, a current location of the electronic device 1000, a current operation mode (for example, information about a recognition model in use, a recognition result, or the like) of the electronic device 1000, or a state (for example, remaining battery power) of the electronic device 1000. In addition, the display may display a user interface (UI) or a graphic user interface (GUI), which is related to settings of the electronic device 1000.

When the display of the output interface 1110 and a touch pad form a layer structure and thus constitute a touch screen, the display may also be used as an input device in addition to being used as an output device. The display may include any one or any combination of a liquid crystal display, a thin-film transistor-liquid crystal display, an organic light-emitting diode, a flexible display, a three-dimensional (3D) display, or an electrophoretic display. In addition, the electronic device 1000 may include two or more displays according to an implementation type of the electronic device 1000.

The driver 1120 according to an embodiment of the disclosure may include components used to drive the electronic device 1000 and operate devices inside the electronic device 1000. The driver 1120 may include, but is not limited to, a plurality of wheels, motors rotationally driving the respective wheels, and the like.

The user interface 1130 according to an embodiment of the disclosure refers to a device for inputting data for a user to control the electronic device 1000. For example, the user interface 1130 may include, but is not limited to, a keypad, a dome switch, a touch pad (a touch capacitive type, a pressure resistive type, an infrared beam sensing type, a surface acoustic wave type, an integral strain gauge type, a piezoelectric type, or the like), a jog wheel, a jog switch, or the like.

The memory 1400 according to an embodiment of the disclosure may include a space information generating module 1410. The processor 1300 may generate a spatial map by using a spatial map generating application in the space information generating module 1410. In this case, although information used to generate the spatial map may be obtained through the sensor(s) 1100, the user interface 1130, or the communication interface 1200, the disclosure is not limited thereto.

The processor 1300 may logically divide a space by using a space logical-division application in the space information generating module 1410. In this case, information used to logically divide the space may include the spatial map and first object information.

The memory 1400 according to an embodiment of the disclosure may include an object recognition module 1420. The processor 1300 may perform object recognition by using a plurality of recognition models stored in the memory 1400. The processor 1300 may obtain the first object information about recognition target objects in the whole space by using a first recognition model in the object recognition module 1420, and may obtain second object information about the recognition target objects in subset spaces, which are obtained by logically dividing the whole space, by using a plurality of second recognition models.

The memory 1400 according to an embodiment of the disclosure may include a recognition model determining module 1430. The processor 1300 may determine a second recognition model, which is to be allocated to each of the plurality of subset spaces, by using the recognition model determining module 1430 stored in the memory 1400. However, the determination of a recognition model is not limited to a function of the electronic device 1000, and the model generation server 2000 may also determine the recognition model.

The model generation server 2000 according to an embodiment of the disclosure may include the communication interface 2100, the processor 2200, and the memory 2300.

Because the communication interface 2100, the processor 2200, and the memory 2300 in FIG. 13 respectively correspond to the communication interface 2100, the processor 2200, and the memory 2300 in FIG. 2, repeated descriptions thereof may be omitted.

The memory 2300 of the model generation server 2000 according to an embodiment of the disclosure may include a recognition model determining module 2310. Because a function of the recognition model determining module 2310 of the model generation server 2000 corresponds to the function of the recognition model determining module 1430 of the electronic device 1000, repeated descriptions thereof may be omitted.

The memory 2300 of the model generation server 2000 may include a recognition model generating module 2320. When there is no recognition model, which corresponds to the recognition model determined by the recognition model determining module 2310, in the memory 2300, the processor 2200 may generate a new recognition model through training by using the recognition model generating module 2320.

The data server 3000 according to an embodiment of the disclosure may include a communication interface 3100, a processor 3200, and a storage device 3300.

The communication interface 3100 according to an embodiment of the disclosure may receive a training dataset request from the model generation server 2000 and may transmit a generated training dataset corresponding thereto.

The storage device 3300 according to an embodiment of the disclosure may store various data, programs, or applications for driving and controlling the data server 3000, and training image data for generating recognition models.

The storage device 3300 of the data server 3000 according to an embodiment of the disclosure may include a training dataset generating module 3310. In response to the training dataset request from the model generation server 2000, the processor 3200 may generate the training dataset by extracting images, which are consistent with the training dataset request, from images stored in the storage device 3300, by using the training dataset generating module 3310.

The block diagrams of FIGS. 2 and 13 illustrating the electronic device 1000, the model generation server 2000, and the data server 3000 are block diagrams for an embodiment of the disclosure. Each component in the block diagrams may be integrated, added, or omitted according to specifications of each device that is actually implemented. That is, according to the needs, two or more components may be integrated into one component, or one component may be configured by two or more subdivided components. In addition, a function performed by each block is for describing embodiments, and an operation or device does not limit the scope of the disclosure.

A method of operating an electronic device, according to an embodiment of the disclosure, may be implemented in the form of program instructions executable through various computer devices and be recorded on a computer-readable recording medium. The computer-readable recording medium may include program instructions, data files, data structures, or the like alone or in combination. The program instructions recorded on the above-described medium may be designed and configured for the disclosure or may be known to those of ordinary skill in the art of computer software and thus available. Examples of a computer-readable recording medium include magnetic media such as a hard disk, a floppy disk, and magnetic tape, optical media such as CD-ROM and a digital versatile disc (DVD), magneto-optical media such as a floptical disk, and hardware devices configured to store and execute program instructions, such as ROM, RAM, and flash memory. Examples of the program instructions include machine language code made by a compiler, and high-level language code capable of being executed by a computer by using an interpreter or the like.

In addition, the electronic device or the method of operating the electronic device, according to the disclosed embodiments of the disclosure, may be provided while included in a computer program product. The computer program product may be traded, as merchandise, between a seller and a buyer.

The computer program product may include a software (S/WV) program and a computer-readable storage medium having stored therein the S/W program. For example, the computer program product may include a product (for example, a downloadable application) that is in the form of an S/W program electronically distributed by a manufacturer of the electronic device or an electronic market (for example, Google Play Store, or App Store). For electronic distribution, at least a portion of the S/W program may be stored in a storage medium or may be temporarily generated. In this case, the storage medium may be a storage medium of a server of a manufacturer or a server of an electronic market, or a storage medium of a relay server, which temporarily stores the S/W program.

In a system including a server and a client device, the computer program product may include a storage medium of the server or a storage medium of the client device. Alternatively, when there is a third device (for example, a smart phone) communicatively connected to the server or the client device, the computer program product may include a storage medium of the third device. Alternatively, the computer program product may include the S/W program itself, which is transmitted from the server to the client device or the third device or transmitted from the third device to the client device.

In this case, any one or any combination of the server, the client server, or the third device may execute the computer program product and thus perform the method according to disclosed embodiments of the disclosure. Alternatively, two or more of the server, the client server, and the third device may execute the computer program product to perform the method according to disclosed embodiments of the disclosure in a distributed fashion.

For example, the server (for example, a cloud server, an artificial intelligence server, or the like) may execute the computer program product stored in the server to control the client device communicatively connected to the server to perform the method according to disclosed embodiments of the disclosure.

An electronic device for performing object recognition, according to an embodiment of the disclosure, may logically divide a physical space and may determine an object recognition model, which is to be used for each divided space, to be suitable for characteristics of each space, thereby performing object recognition by efficiently using computing resources in the electronic device.

In addition, the electronic device may perform object recognition by using the recognition model determined based on space characteristic information of each space, thereby maximizing recognition accuracy.

Heretofore, while the embodiments of the disclosure have been described in detail, it will be understood that the scope of the disclosure is not limited thereto and various changes in form and details may be made therein without departing from the spirit and scope of the following claims.

What is claimed is:

1. A method, performed by an electronic device, of performing object recognition, the method comprising:
    obtaining a spatial map of a space;
    using a first recognition model, recognizing a plurality of objects in the space, to obtain first object information of the plurality of objects;
    dividing the space into a plurality of unit spaces, based on the obtained spatial map, wherein each unit space has a same shape and a same size;
    grouping, into a plurality of groups, the plurality of unit spaces into which the space is divided, based on the obtained first object information;
    setting a plurality of subset spaces so that each of the plurality of subset spaces comprises one or more of the plurality of unit spaces that are grouped into a same group among the plurality of groups;
    determining at least one second recognition model to be allocated to each of the plurality of subset spaces into which the space is divided, based on characteristic information of each of the plurality of subset spaces; and
    using the determined at least one second recognition model allocated to each of the plurality of subset spaces, performing object recognition on each of the plurality of subset spaces, to obtain second object information.

2. The method of claim 1, wherein the obtaining of the spatial map comprises:
obtaining spatial structure information of the space by scanning the space; and
generating the spatial map, based on the obtained spatial structure information.

3. The method of claim 1, wherein the determining of the at least one second recognition model comprises:
requesting, from a server, the at least one second recognition model; and
receiving, from the server, the requested at least one second recognition model.

4. The method of claim 3, wherein the determining of the at least one second recognition model further comprises transmitting, to the server, the characteristic information of each of the plurality of subset spaces, and
wherein the at least one second recognition model received from the server is determined by the server, based on the transmitted characteristic information of each of the plurality of subset spaces.

5. The method of claim 1, wherein the dividing of the space into the plurality of subset spaces comprises determining a number of the plurality of subset spaces, based on a number of classes into which the plurality of objects recognized in the space are classified.

6. The method of claim 1, wherein the plurality of unit spaces are grouped based on priority information corresponding to a plurality of classes.

7. The method of claim 6, wherein the plurality of unit spaces further comprises:
determining a class that is present in a largest number of the plurality of objects that are included in each of the plurality of unit spaces, from among the plurality of classes, to obtain characteristic information of each of the plurality of unit spaces; and
grouping one or more unit spaces from among the plurality of unit spaces having a same characteristic information from among the characteristic information of each of the plurality of unit spaces.

8. The method of claim 1, wherein the characteristic information of each of the plurality of subset spaces comprises information of a number of at least one of the plurality of objects for each class, the at least one of the plurality of objects being included in each of the plurality of subset spaces, and
wherein the determining of the at least one second recognition model comprises determining the at least one second recognition model to be allocated to each of the plurality of subset spaces into which the space is divided, based on the information of the number of the at least one of the plurality of objects for each class.

9. The method of claim 1, wherein each unit space has a hexagonal shape or a quadrangular shape.

10. An electronic device comprising:
a memory storing one or more instructions and a plurality of recognition models; and
a processor configured to execute the one or more instructions stored in the memory to:
obtain a spatial map of a space;
using a first recognition model among the plurality of recognition models stored in the memory, recognize a plurality of objects in the space, to obtain first object information of the plurality of objects;
divide the space into a plurality of unit spaces, based on the obtained spatial map, wherein each unit space has a same shape and a same size;
group, into a plurality of groups, the plurality of unit spaces into which the spaced is divided, based on the obtained first object information;
set a plurality of subset spaces so that each of the plurality of subset spaces comprises one or more of the plurality of unit spaces that are grouped into a same group among the plurality of groups;
determine at least one second recognition model to be allocated to each of the plurality of subset spaces into which the space is divided, among the plurality of recognition models stored in the memory, based on characteristic information of each of the plurality of subset spaces; and
using the determined at least one second recognition model allocated to each of the plurality of subset spaces, perform object recognition on each of the plurality of subset spaces, to obtain second object information.

11. The electronic device of claim 10, further comprising one or more sensors configured to obtain spatial structure information about the space by scanning the space,
wherein the processor is further configured to execute the one or more instructions stored in the memory to generate the spatial map, based on the obtained spatial structure information.

12. The electronic device of claim 10, further comprising a communication interface,
wherein the processor is further configured to execute the one or more instructions stored in the memory to:
control the communication interface to transmit, to a server, a request for the at least one second recognition model; and
receive, from the server, the requested at least one second recognition model.

13. The electronic device of claim 12, wherein the processor is further configured to execute the one or more instructions stored in the memory to control the communication interface to transmit, to the server, the characteristic information of each of the plurality of subset spaces, and
wherein the at least one second recognition model received from the server is determined by the server, based on the transmitted characteristic information of each of the plurality of subset spaces.

14. The electronic device of claim 10, wherein the processor is further configured to execute the one or more instructions stored in the memory to determine a number of the plurality of subset spaces, based on a number of classes into which the plurality of objects recognized in the space are classified.

15. The electronic device of claim 10, wherein the processor is further configured to execute the one or more instructions stored in the memory to group the plurality of unit spaces, based on priority information corresponding to a plurality of classes.

16. The electronic device of claim 15, wherein the processor is further configured to execute the one or more instructions stored in the memory to:
determine a class that is present in a largest number of the plurality of objects that are included in each of the plurality of unit spaces, from among the plurality of classes, to obtain characteristic information of each of the plurality of unit spaces; and
group one or more unit spaces from among the plurality of unit spaces having a same characteristic information from among the characteristic information of each of the plurality of unit spaces.

17. The electronic device of claim 10, wherein the characteristic information of each of the plurality of subset spaces comprises information of a number of at least one of the plurality of objects for each class, the at least one of the plurality of objects being included in each of the plurality of subset spaces, and wherein the processor is further configured to execute the one or more instructions stored in the memory to determine the at least one second recognition model to be allocated to each of the plurality of subset spaces into which the space is divided, based on the information of the number of the at least one of the plurality of objects for each class.

18. A computer-readable recording medium configured to store instructions which, when executed by a processor of a device for performing object recognition, cause the device to:

obtain a spatial map of a space;

using a first recognition model among a plurality of recognition models, recognize a plurality of objects in the space, to obtain first object information of the plurality of objects;

divide the space into a plurality of unit spaces, based on the obtained spatial map, wherein each unit space has a same shape and a same size;

group, into a plurality of groups, the plurality of unit spaces into which the spaced is divided, based on the obtained first object information;

set a plurality of subset spaces so that each of the plurality of subset spaces comprises one or more of the plurality of unit spaces that are grouped into a same group among the plurality of groups;

determine at least one second recognition model to be allocated to each of the plurality of subset spaces into which the space is divided, among the plurality of recognition models, based on characteristic information of each of the plurality of subset spaces; and using the determined at least one second recognition model allocated to each of the plurality of subset spaces, perform object recognition on each of the plurality of subset spaces, to obtain second object information.

19. A method of performing object recognition, the method being performed by an electronic device, and the method comprising:

obtaining a spatial map of a space;

using a first recognition model, recognizing a plurality of objects in the space, to obtain first object information of the plurality of objects;

dividing the space into a plurality of unit spaces, based on the obtained spatial map, wherein each unit space has a same shape and a same size;

determining a class that is present in a largest number of the plurality of objects included in each of the plurality of unit spaces into which the space is divided, from among a plurality of classes, to obtain characteristic information of each of the plurality of unit spaces;

grouping, into a plurality of groups, the plurality of unit spaces into which the space is divided, based on the characteristic information of each of the plurality of unit spaces;

setting a plurality of subset spaces so that each of the plurality of subset spaces comprises one or more of the plurality of unit spaces that are grouped into a same group among the plurality of groups;

determining at least one second recognition model for each of the plurality of subset spaces, based on characteristic information of each of the plurality of subset spaces; and using the determined at least one second recognition model for each of the plurality of subset spaces, recognizing at least one object in each of the plurality of subset spaces, to obtain second object information of the at least one object.

* * * * *